(12) United States Patent
Ehrlich

(10) Patent No.: US 7,130,146 B2
(45) Date of Patent: Oct. 31, 2006

(54) TWO-PASS-PER-TRACK SERVO BURST PATTERNS

(75) Inventor: Richard M. Ehrlich, Saratoga, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/081,445

(22) Filed: Mar. 16, 2005

(65) Prior Publication Data

US 2006/0209455 A1 Sep. 21, 2006

(51) Int. Cl.
*G11B 5/596* (2006.01)

(52) U.S. Cl. .................................... 360/77.08

(58) Field of Classification Search ............. 360/77.08, 360/75, 31; 714/774
See application file for complete search history.

(56) References Cited

U.S. PATENT DOCUMENTS

| | | | |
|---|---|---|---|
| 4,484,238 A | 11/1984 | Vinal | |
| 5,012,363 A | 4/1991 | Mine et al. | |
| 5,107,378 A | 4/1992 | Cronch et al. | |
| 5,392,174 A | 2/1995 | Suzuki | |
| 5,570,247 A | 10/1996 | Brown et al. | |
| 5,691,857 A | 11/1997 | Fitzpatrick et al. | |
| 5,771,131 A | 6/1998 | Pirzadeh | |
| 5,907,450 A | 5/1999 | Ishikawa | |
| 5,940,240 A | 8/1999 | Kupferman | |
| 5,946,157 A * | 8/1999 | Codilian et al. | 360/75 |
| 5,946,158 A | 8/1999 | Nazarian et al. | |
| 5,949,603 A | 9/1999 | Brown et al. | |
| 5,966,264 A | 10/1999 | Belser et al. | |
| 6,023,389 A | 2/2000 | Cunningham | |
| 6,025,970 A | 2/2000 | Cheung | |
| 6,040,955 A | 3/2000 | Brown et al. | |
| 6,091,567 A | 7/2000 | Cooper et al. | |
| 6,101,053 A | 8/2000 | Takahashi | |
| 6,118,614 A | 9/2000 | Lee | |
| 6,198,583 B1 | 3/2001 | Ohinata et al. | |
| 6,304,407 B1 | 10/2001 | Baker et al. | |
| 6,369,971 B1 | 4/2002 | Everett | |
| 6,411,459 B1 | 6/2002 | Belser et al. | |

(Continued)

FOREIGN PATENT DOCUMENTS

JP 61211814 9/1986

(Continued)

OTHER PUBLICATIONS

Ono, H, "Architecture and Performance of the ESPER-2 Hard-Disk Drive Servo Writer," IBM J. Res. Develop., 37(1):3-11 (1993).

*Primary Examiner*—Fred F. Tzeng
(74) *Attorney, Agent, or Firm*—Fliesler Meyer LLP

(57) ABSTRACT

A rotatable storage media includes multiple concentric data tracks and servo sectors embedded within the tracks. In some embodiments, the servo sectors have servo burst patterns including a plurality of burst groups, with each of the burst groups including a trimmed burst that is stitched and trimmed such that is has a first width, and an untrimmed burst that has a second width that is less than the first width. In other embodiments, each of the burst groups include a pair of untrimmed bursts, with one of the untrimmed bursts being wider than the other. In still another embodiment, all bursts are trimmed, but some are wider than others. Preferably, such burst patterns are written using a two-pass-per-track servowriting scheme. This description is not intended to be a complete description of, or limit the scope of, the invention.

39 Claims, 17 Drawing Sheets

U.S. PATENT DOCUMENTS

| | | |
|---|---|---|
| 6,445,521 B1 | 9/2002 | Schaff et al. |
| 6,519,107 B1 * | 2/2003 | Ehrlich et al. ............... 360/75 |
| 6,600,620 B1 | 7/2003 | Krounbi et al. |
| 6,738,215 B1 | 5/2004 | Yatsu |
| 6,760,185 B1 | 7/2004 | Roth et al. |
| 6,791,780 B1 | 9/2004 | Lee et al. |
| 6,922,304 B1 | 7/2005 | Nakagawa |
| 6,940,677 B1 * | 9/2005 | Fukushima et al. ......... 360/75 |
| 6,957,379 B1 * | 10/2005 | Patapoutian et al. ....... 714/774 |
| 6,977,792 B1 * | 12/2005 | Melrose et al. .............. 360/75 |
| 2003/0161061 A1 | 8/2003 | Lamberts |
| 2004/0123025 A1 | 6/2004 | Chainer et al. |
| 2005/0068662 A1 * | 3/2005 | Sado ........................ 360/75 |
| 2005/0073770 A1 * | 4/2005 | Ehrlich et al. .............. 360/75 |
| 2005/0248872 A1 | 11/2005 | Ehrlich et al. |
| 2006/0007587 A1 * | 1/2006 | Oki ........................... 360/75 |
| 2006/0018051 A9 * | 1/2006 | Chiao et al. ................ 360/31 |

FOREIGN PATENT DOCUMENTS

| | | |
|---|---|---|
| JP | 63025803 | 2/1988 |
| JP | 10334402 | 12/1998 |

* cited by examiner

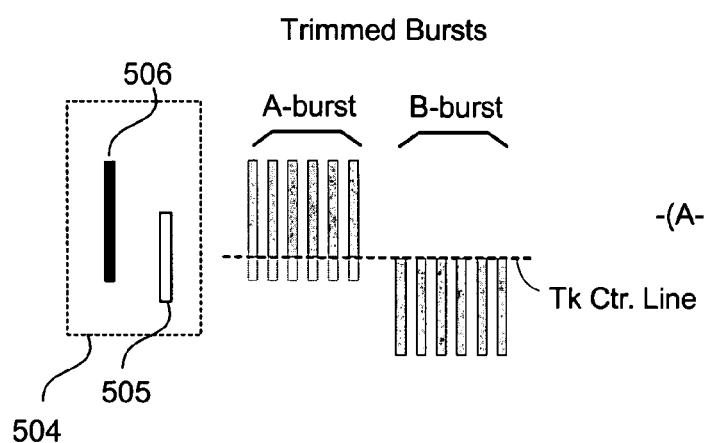
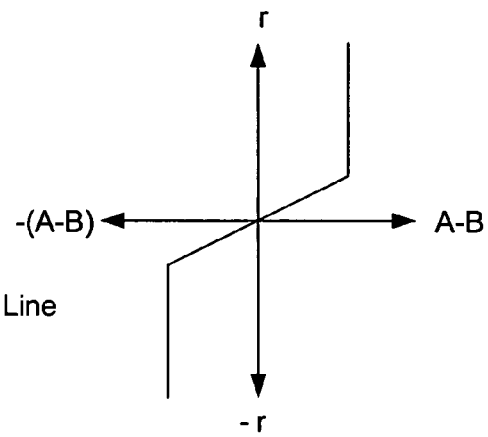
FIG. 5A
FIG. 5B
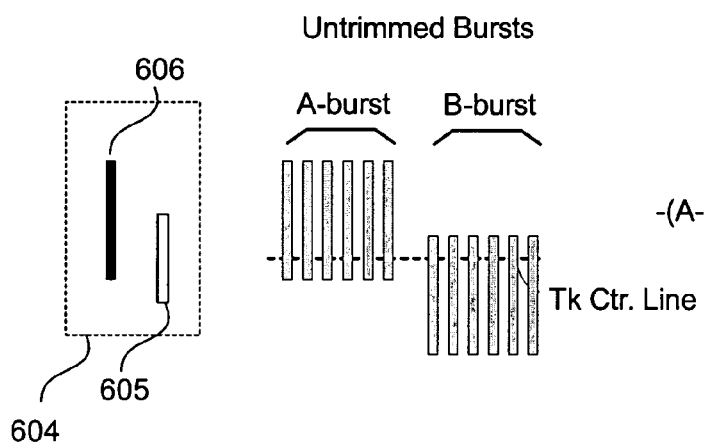
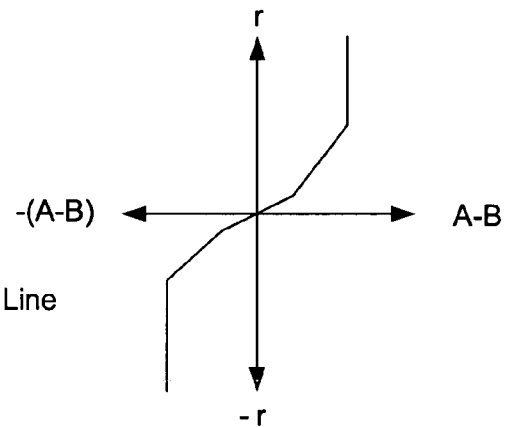
FIG. 6A
FIG. 6B

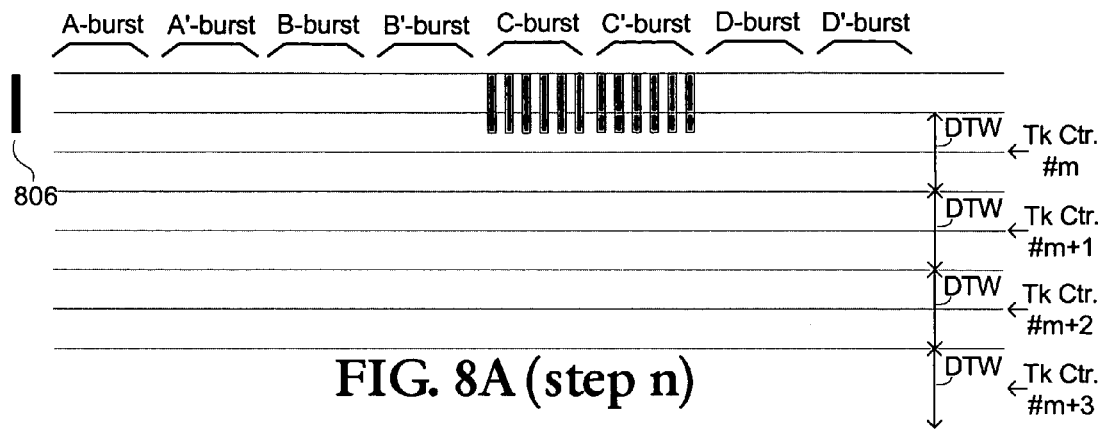
FIG. 8A (step n)
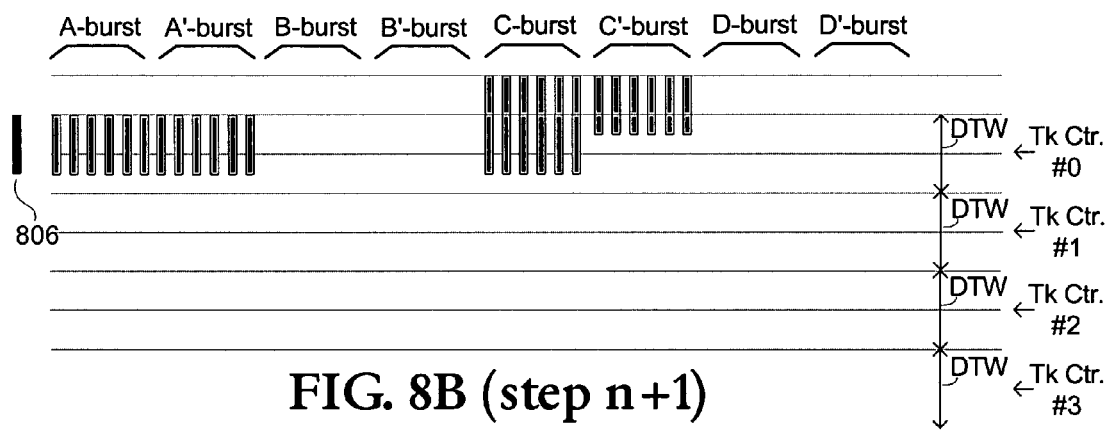
FIG. 8B (step n+1)
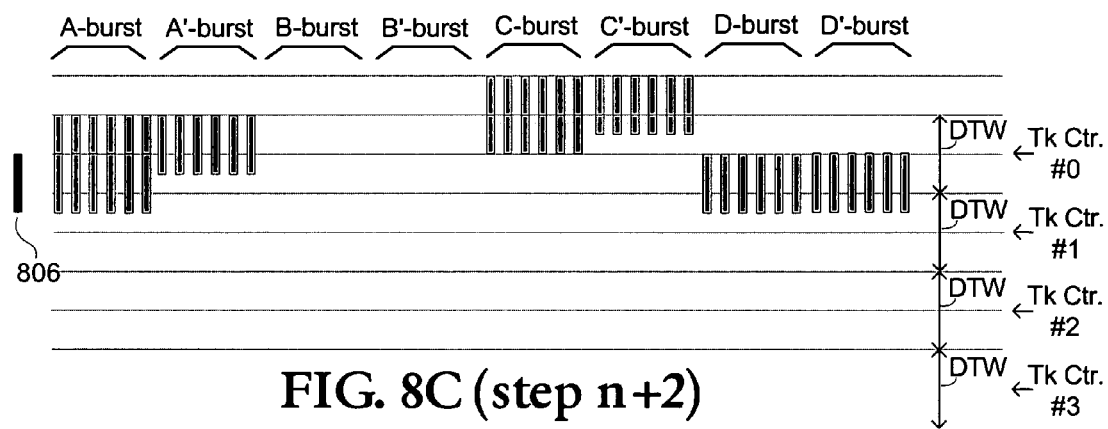
FIG. 8C (step n+2)

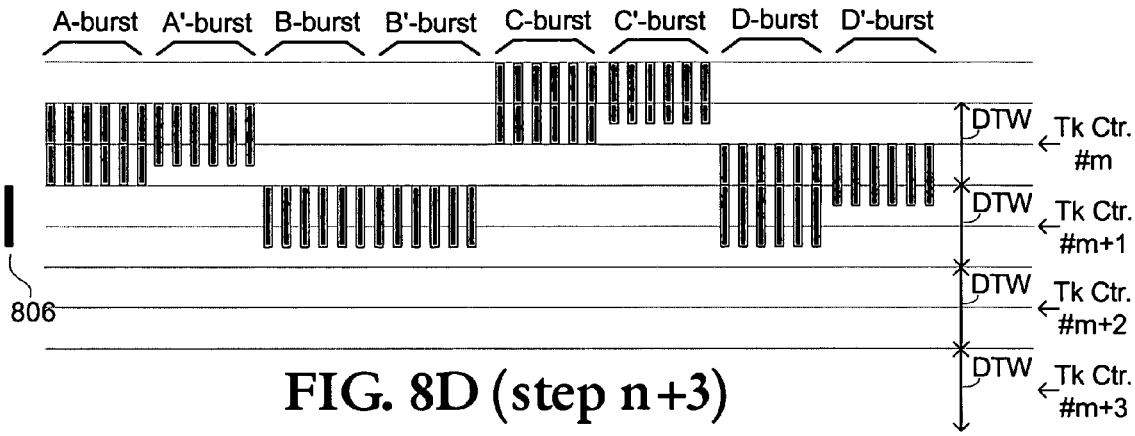
FIG. 8D (step n+3)
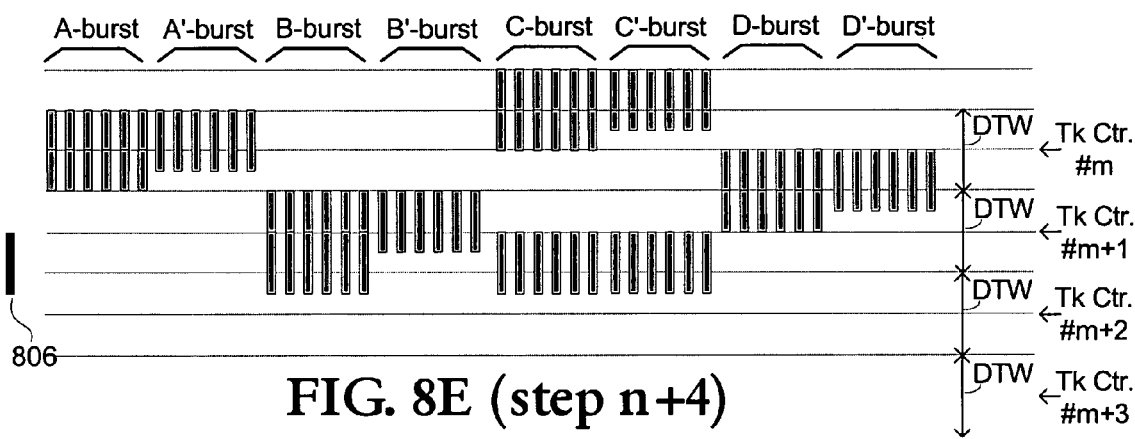
FIG. 8E (step n+4)
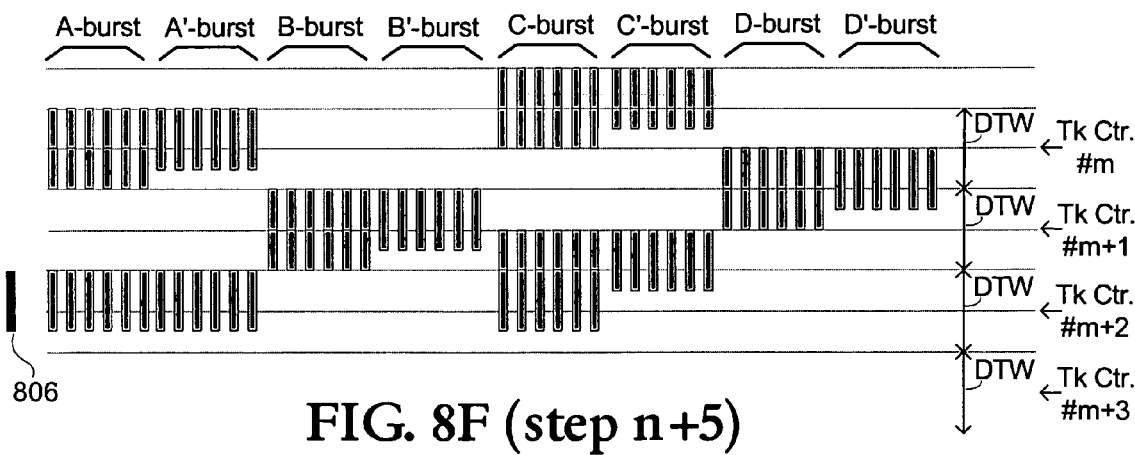
FIG. 8F (step n+5)

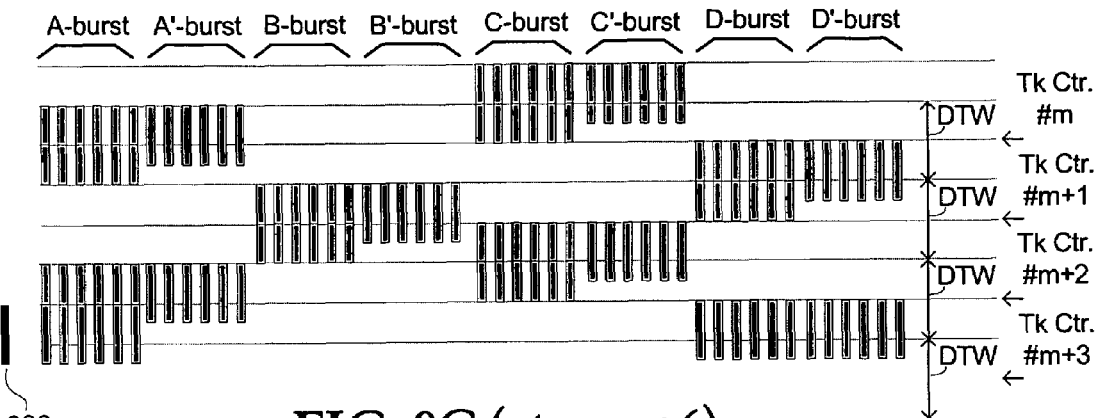
FIG. 8G (step n+6)
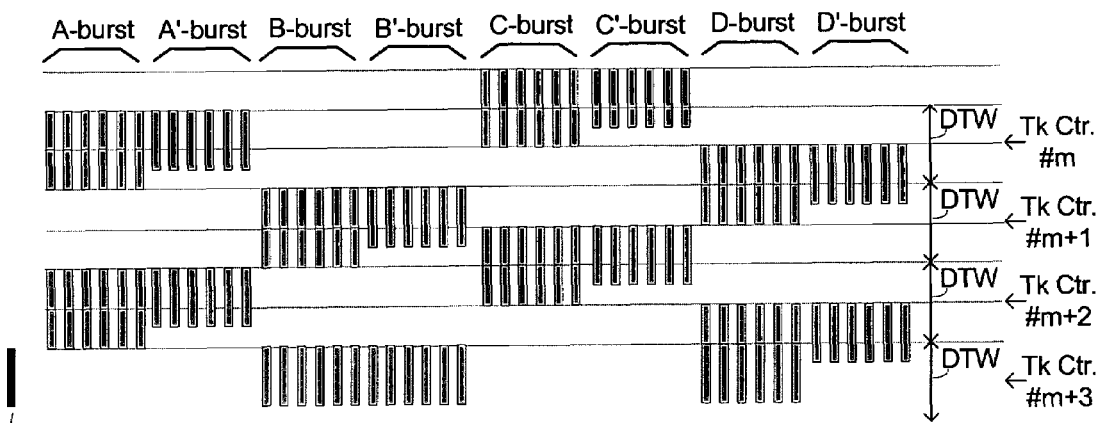
FIG. 8H (step n+7)
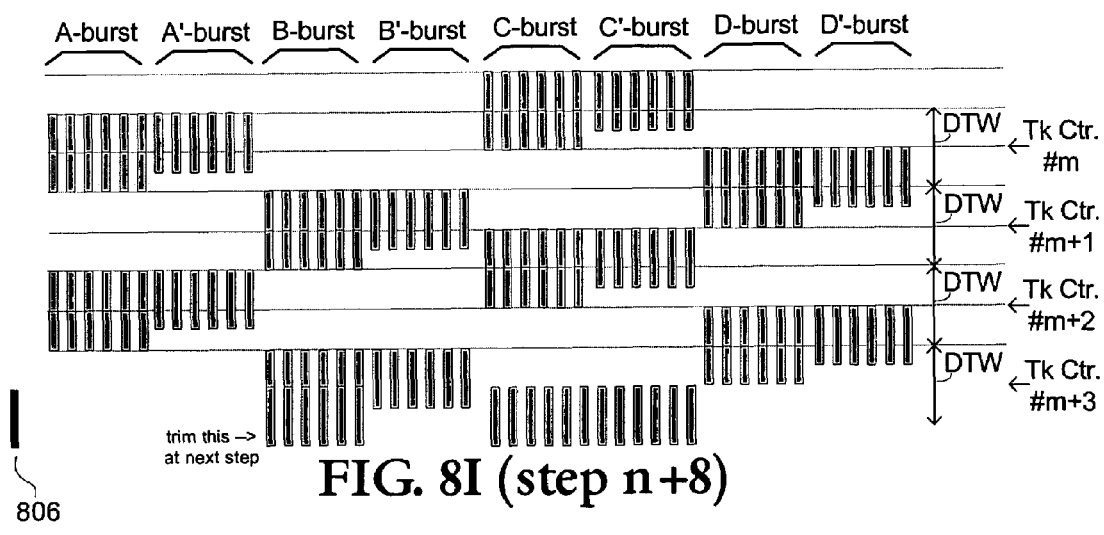
FIG. 8I (step n+8)

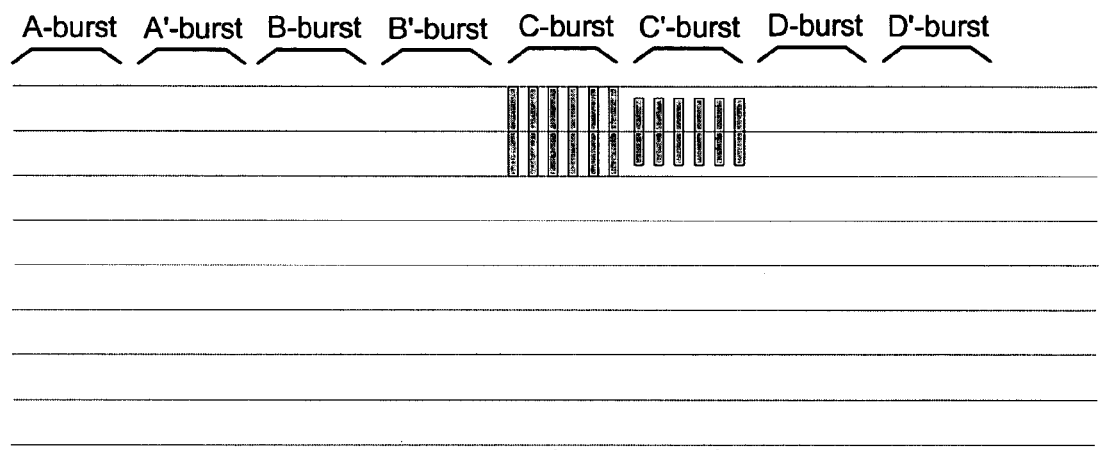
FIG. 10A (step n)
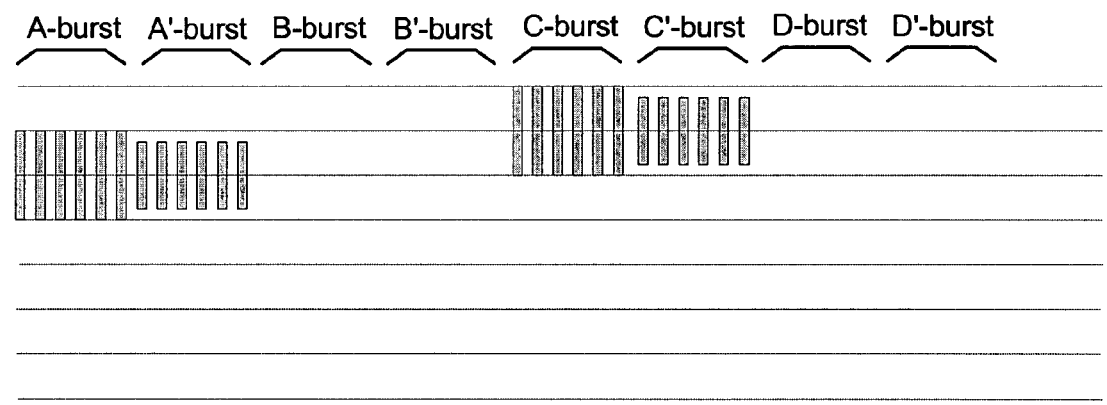
FIG. 10B (step n+1)

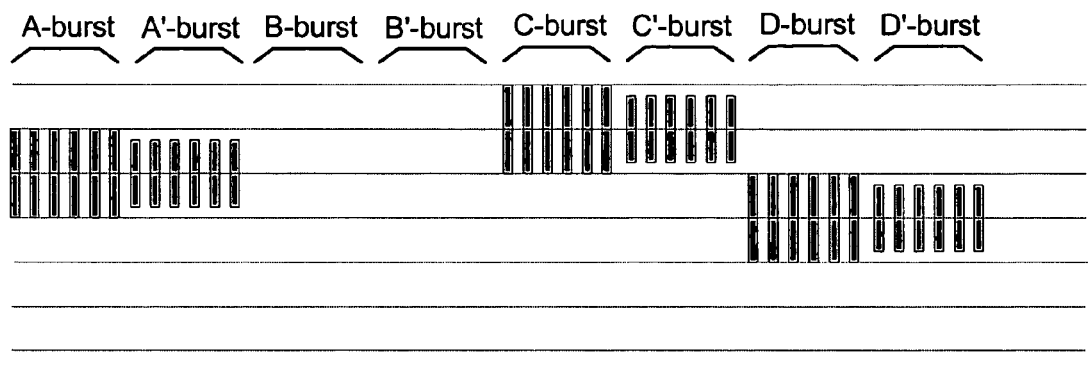
FIG. 10C (step n+2)
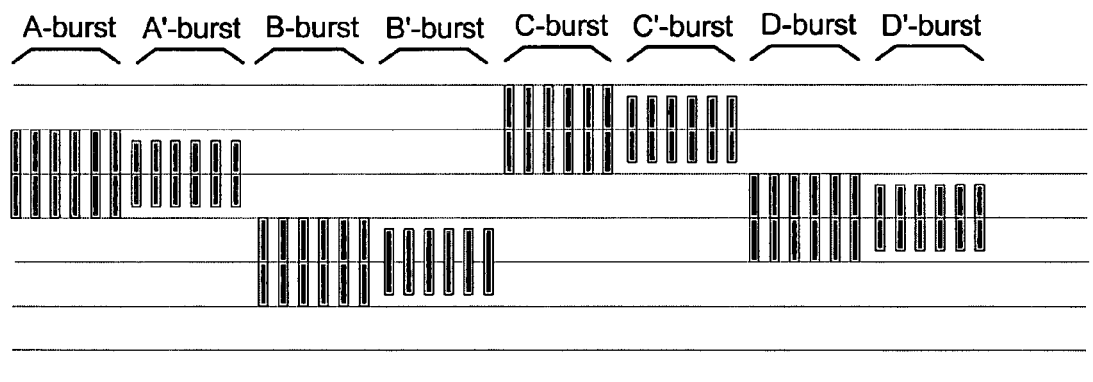
FIG. 10D (step n+3)

TWO-PASS-PER-TRACK SERVO BURST PATTERNS

CROSS-REFERENCED CASES

The following applications are cross-referenced and incorporated herein by reference:

U.S. patent application Ser. No. 10/818,181, entitled "Systems for Self-Servowriting with Multiple Passes Per Servowriting Step," by Richard M. Ehrlich, filed Apr. 5, 2004.

U.S. patent application Ser. No. 10/818,185, entitled "Methods for Self-Servowriting with Multiple Passes Per Servowriting Step," by Richard M. Ehrlich, filed Apr. 5, 2004.

U.S. patent application Ser. No. 10/818,473, entitled "Systems for Self-Servowriting Using Write-Current Variation," by Richard M. Ehrlich, filed Apr. 5, 2004.

U.S. patent application Ser. No. 10/818,174, entitled "Methods for Self-Servowriting Using Write-Current Variation," by Richard M. Ehrlich, filed Apr. 5, 2004.

U.S. patent application Ser. No. 10/983,376, entitled "Methods for Increasing the Usable Position Error Signal (PES) Region," by Richard M. Ehrlich, filed Nov. 8, 2004.

U.S. patent application Ser. No. 10/983,448, entitled "Systems for Increasing the Usable Position Error Signal (PES) Region," by Richard M. Ehrlich, filed Nov. 8, 2004.

FIELD OF THE INVENTION

The present invention relates to servowriting processes and devices, and rotatable storage media that include servo burst patterns, and storage devices that include rotatable storage media.

BACKGROUND

Advances in data storage technology have provided for ever-increasing storage capability in devices such as DVD-ROMs, optical drives, and disk drives. In hard disk drives, for example, the width of a written data track has decreased due in part to advances in reading, writing, and positioning technologies. Narrower data tracks result in higher density drives, which is good for the consumer but creates new challenges for drive manufacturers. For example, as data tracks are narrowed, so are the read elements used to read the tracks. However, as read elements become narrower, and previously-used head-width tolerances become more difficult to achieve, controlling position error signal (PES) linearity becomes more difficult. Accordingly, it is desirable to provide for PES linearity improvements, e.g., by increasing the useable PES region.

Many servowriting techniques (e.g., self-servowriting techniques) require a three or more step-per-track servowriting process to provide a more linear (or at least, a linearizable) PES at all locations along a track. It would be preferable to reduce the number of steps-per-track, because the less steps per track, the faster the servo information can be written onto a disk.

SUMMARY OF THE INVENTION

Embodiments of the present invention are directed to rotatable storage media including multiple concentric data tracks and servo sectors embedded within the tracks, as well as to methods for writing the servo sectors. In some embodiments, the servo sectors have servo burst patterns including a plurality of burst groups, with each of the burst groups including a trimmed burst that is stitched and trimmed such that is has a first width, and an untrimmed burst that has a second width that is less than the first width. In other embodiments, each of the burst groups include a pair of untrimmed bursts, with one of the untrimmed bursts being wider than the other. In still another embodiment, all bursts are trimmed, but some are wider than others. Preferably, such burst patterns are written using a two-pass-per-track servowriting scheme. This summary is not intended to be a complete description of, or limit the scope of, the invention.

BRIEF DESCRIPTION OF THE DRAWINGS

FIG. 5A is a schematic representation of an MR read element juxtaposed next to two radially offset, radially trimmed bursts.

FIG. 5B is a graph of burst amplitude difference as a function of MR read-element radial displacement from a burst-established track centerline for the FIG. 5A trimmed burst pattern.

FIG. 6A is a schematic representation of an MR read element juxtaposed next to two radially offset, untrimmed bursts.

FIG. 6B is a graph of burst amplitude difference as a function of MR read-element radial displacement from a burst-established track centerline for the FIG. 6A untrimmed burst pattern.

FIGS. 8A–I are diagrams that are useful for describing how the servo-burst burst pattern shown in FIG. 7A can be written using a two-servowriting-step-per-data-track process, in accordance with certain embodiments of the present invention.

FIGS. 10A–D are diagrams that are useful for describing how the servo-burst burst pattern shown in FIG. 9 can be written using a two-servowriting-step-per-data-track process, in accordance with certain embodiments of the present invention.

DETAILED DESCRIPTION

Embodiments of the present invention are directed to rotatable storage media that include specific servo burst patterns. Embodiments of the present invention are also directed to methods for writing such servo burst patterns, and to devices that include storage media with such burst patterns. The methods of the present invention can be used when servowriting or self-servowriting a rotatable storage media in a data storage device, such as a hard disk drive. The methods of the present invention can also be used by a media writer that writes servo bursts patterns on rotatable storage media that are eventually placed in a drive.

Figure 1:
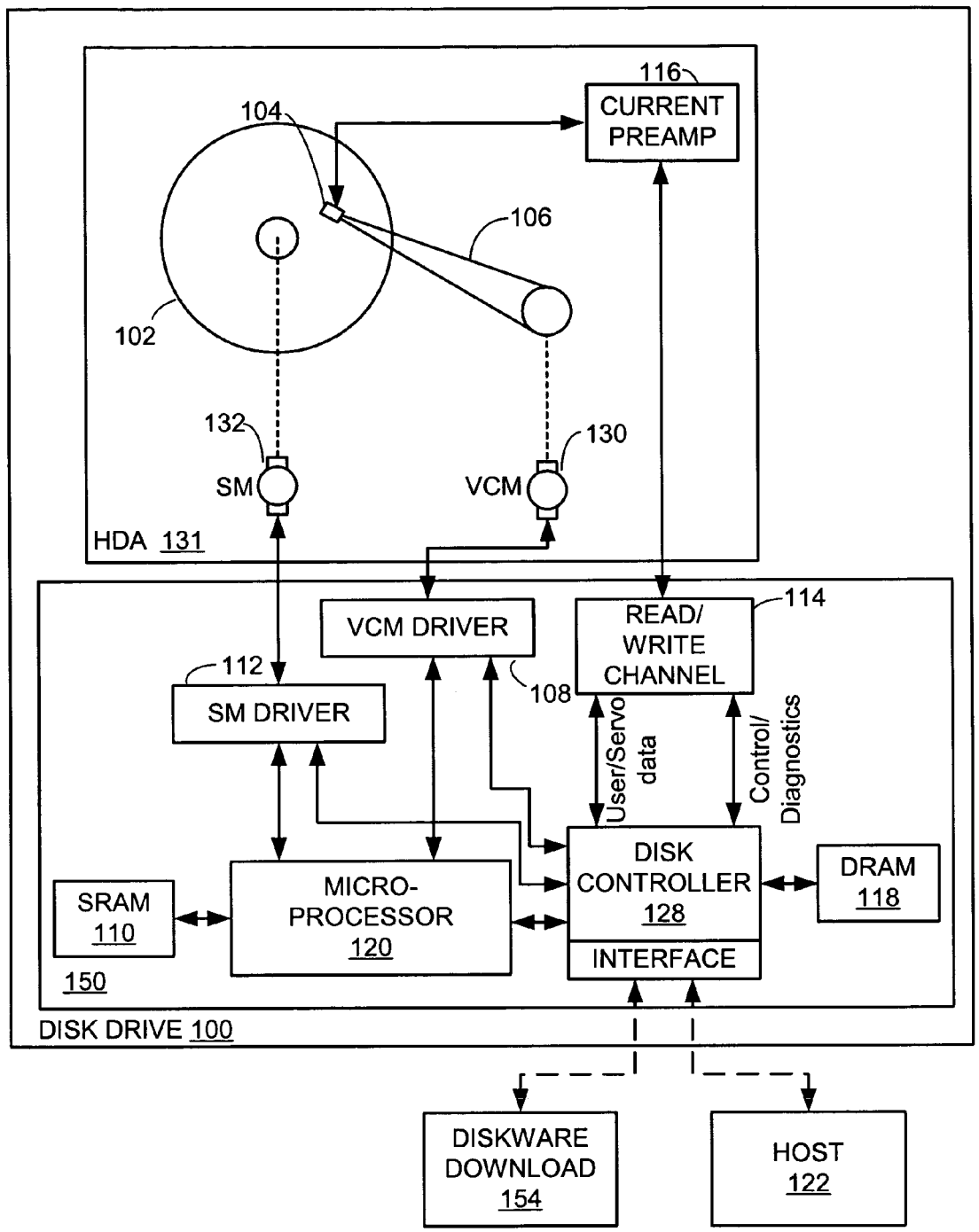
FIG. 1 is a diagram showing components of an exemplary disk drive that can be used with embodiments of the present invention.

An exemplary disk drive 100 is described with reference to FIG. 1. The drive is shown as including a head disk assembly (HDA) 131 and a drive circuit board 150. The exemplary HDA 131 includes at least one disk 102, an actuator assembly 106, a read/write (R/W) head 104, a current pre-amplifier 116, a spindle motor (SM) 132 and a voice coil motor (VCM) 130. The drive circuit board 150 typically includes a R/W channel 114, a SM driver 112, a VCM driver 108, a microprocessor 120 and a disk controller 128. More or fewer chips may actually be included on the board 150, depending upon the particular circuit integration at the chip/board level. Various combinations of the blocks shown in FIG. 1 may be integrated onto common chips (or onto a single chip). The drive electronics printed circuit board 150 is attached to the HDA 131 and connected to the R/W head 104 via the preamplifier 116, SM 132 and VCM 130, and the R/W channel 114 is connected to the read and write elements of the R/W head 104 via the preamplifier 116. A structurally completed hard disk drive 100 results.

The microprocessor 120 can include a servo system controller, which can exist as circuitry within the drive or as an algorithm resident in the microprocessor 120, or as a combination thereof. In other embodiments, an independent servo controller can be used. Additionally, the microprocessor 120 may include some amount of memory such as SRAM, or an external memory such as SRAM 110 can be coupled with the microprocessor 120. The disk controller 128 can provide user data to the read/write channel 114, which can send signals to the current amplifier or preamp 116 to be written to the disk 102, and can send servo signals to the microprocessor 120. The disk controller 128 can also include a memory controller to interface with memory 118. Memory 118 can be DRAM, which in some embodiments, can be used as a buffer memory.

Although shown as separate components, the VCM driver 108 and spindle motor driver 112 can be combined into a single "hard disk power-chip." It is also possible to include the spindle speed control circuitry in that chip. The microprocessor 120 is shown as a single unit directly communicating with the VCM driver 108, although a separate VCM controller processor (not shown) may be used in conjunction with processor 120 to control the VCM driver 108. Further, the processor 120 can directly control the spindle motor driver 112, as shown. Alternatively, a separate spindle motor controller processor (not shown) can be used in conjunction with microprocessor 120. Various analog to digital converters and digital to analog converters and other processing circuitry are also included within the head position servo control loop as is well understood by those skilled in the art and therefore not described herein in any further detail.

The closed-loop servo system can be used to move the actuator arm 106 and the data head 104 over the surface of the disk(s) 102, such that information can be written to, and read from, the surface of the disk(s) 102. The closed-loop servo system can contain, for example, the VCM driver 108 to drive current through the VCM 130 in order to drive the actuator arm 106, the SM driver 112 to drive current through the SM 132 in order to rotate the disk(s) 102, the microprocessor 120 to control the motors, and the disk controller 128 to transfer information between the microprocessor 120, DRAM buffer 118, read channel 114, and a host 122. The host 122 can be any device, apparatus, or system capable of utilizing the data storage device, such as a personal computer, Web server, or a consumer electronics appliance. The microprocessor 120 can process information for the disk controller 118, read/write channel 114, VCM driver 108, or SM driver 112.

Figure 2:
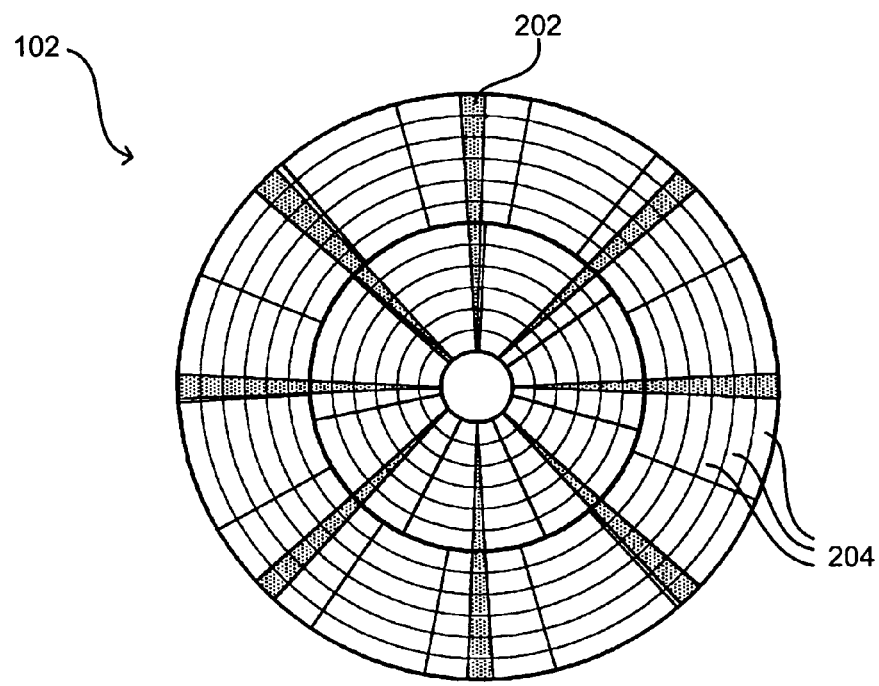
FIG. 2 is a diagram showing an example of a data and servo format for a disk in the drive of FIG. 1.

The information stored on the disk(s) 102 can be written in concentric tracks, extending from near the inner diameter of the disk to near the outer diameter of the disk 102, as shown in the example disk of FIG. 2. In an embedded servo-type system, servo information can be written in servo wedges 202, and can be recorded on tracks 204 that can also contain data. In a system where the actuator arm rotates about a pivot point such as a bearing, the servo wedges may not extend linearly from the inner diameter (ID) of the disk to the outer diameter (OD), but may be curved slightly in order to adjust for the trajectory of the head as it sweeps across the disk.

The servo information often includes bursts of transitions or boundaries called "servo bursts." A boundary or burst boundary as used herein does not mean or imply that servo bursts forming a boundary necessarily have a substantially common edge as the bursts can be spaced such that there is a gap radially or circumferentially between the bursts. The servo information can be positioned regularly about each track, such that when a data head reads the servo information, a relative position of the head can be determined that can be used by a servo processor to adjust the position of the head relative to the track. For each servo wedge, this relative position can be determined in one example as a function of the target location, a track number read from the servo wedge, and the amplitudes or phases of the bursts, or a subset of those bursts. The position of a head or element, such as a read/write head or element, relative to a target or desired location such as the center of a track or other desired location, will be referred to herein as position-error. Position-error distance may be used to refer to the distance between a target or desired location and an actual or predicted location of a head or element. The signal generated as a head or element moves across servo bursts or boundaries between servo bursts is often referred to as a position-error signal (PES).

Figure 3:
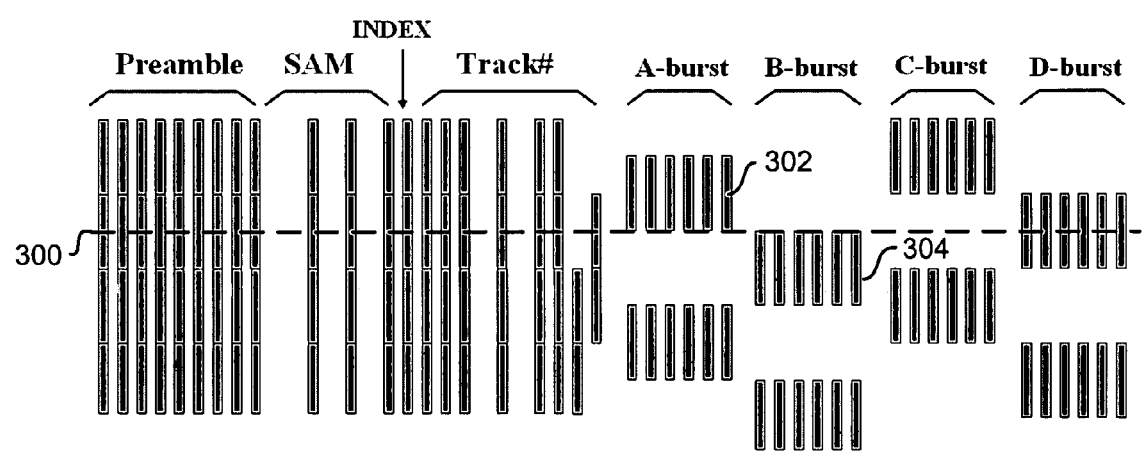
FIG. 3 is a diagram showing exemplary servo data and an exemplary servo-burst pattern that can be written to the tracks shown in FIG. 2.

The PES can be used to represent a position of the head or element relative to a target location such as a track centerline defined by a boundary between servo bursts. FIG. 3 is a diagram showing exemplary servo data and an exemplary servo-burst pattern that can be written to the tracks shown in FIG. 2. A centerline 300 for a given data track can be "defined" relative to a series of bursts, burst edges, or burst boundaries, e.g., such as a burst boundary defined by the lower edge of A-burst 302 and the upper edge of B-burst 304 in FIG. 3. Here, the "lower" edge can refer to the edge of the burst nearest the inner diameter (ID) of a disk, while the "upper" edge can refer to the edge nearest the outer diameter (OD) of the disk. The centerline can also be defined by, or offset relative to, any function or combination of bursts or burst patterns. This can include, for example, a location at which the PES value is a maximum, a minimum, or a fraction or percentage thereof. Any location relative to a function of the bursts can be selected to define track position. For example, if a read head evenly straddles an A-burst and a B-burst, or portions thereof, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero if the radial location defined by the A-burst/B-burst (A/B) combination, or A/B boundary, is the center of a data track, or a track centerline. In such an embodiment, the radial location at which the PES value is zero can be referred to as a null-point. Null-points can be used in each servo wedge to define a relative position of a track. If the head is too far towards the outer diameter of the disk, or above the centerline 300 in FIG. 3, then there will be a greater contribution from the A-burst that results in a more "negative" PES. Using the negative PES, the servo controller could direct the voice coil motor to move the head toward the inner diameter of the disk and closer to its desired position relative to the centerline 300. This can be done for each set of burst edges defining the shape of that track about the disk.

The PES scheme described above is one of many possible schemes for combining the track number read from a servo wedge and the phases or amplitudes of the servo bursts. Many other schemes are possible that can benefit from embodiments in accordance with the present invention.

Exemplary Servo-Pattern and Servowriting Process

FIGS. 4A–4F depict the progression of several steps of an exemplary servowriting process. The pattern shown in these FIGS. is commonly referred to in the trade as a 3-pass-per-track, trimmed-burst pattern, for reasons described below. However, it is to be understood that for this specification the appropriate term is "3-step-per-track" or "3-servowriting-step-per-track". That is to say that each servowriting step can include one or multiple passes and each track is defined by one or multiple servowriting steps. Each FIG. depicts a small portion of the surface of a disk. This portion can contain several servo tracks, extending radially on the disk and vertically in the FIGS., and can cover the space of a single servo wedge, circumferentially on the disk and horizontally in the FIGS. A typical drive can have tens of thousands of servo tracks, and over one hundred wedges per revolution. In the FIGS., the patterned areas indicate portions of the surface of the disk that have been magnetized in one direction. Areas without patterning have been magnetized in another direction, typically in a direction opposite to that of the patterned areas. For drives which use longitudinal recording, the first direction will be substantially in the circumferential direction, and the second direction will be opposite to the first. For drives which use perpendicular recording (also referred to as "vertical recording"), the two directions are perpendicular to the plane of the disk. These simplified FIGS. do not show effects of side-writing of the write element, which can produce non-longitudinal magnetization and erase bands. Such effects are not of primary importance to the discussion herein.

Figure 4A:
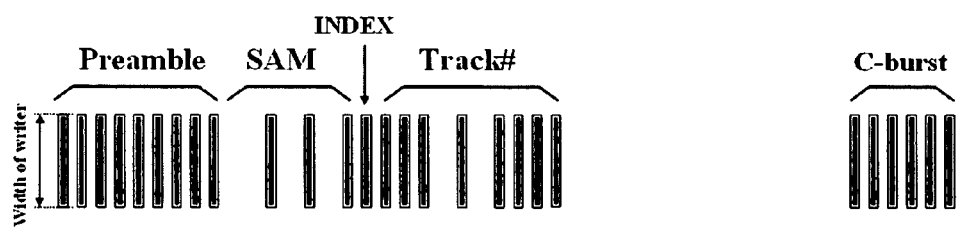
FIGS. 4A–F are diagrams that are useful for describing how a three-servowriting-step-per-data-track process can be used to produce the exemplary servo data and exemplary servo-burst pattern shown in FIG. 3.

In FIG. 4A, the result of a single servowriting step is shown. From that step, the servowriting head (passing from left to right in the FIG.) has written an exemplary servo pattern containing a preamble, followed by a servo-address mark (SAM), followed by an INDEX-bit, and then a track number, as is known in the art. Other information can be written to the servo pattern in addition to, or in place of, the information shown in FIG. 4A. An INDEX-bit, for example, is one piece of information that can be used to give the servo an indication of which wedge is wedge-number zero, useful for determining circumferential position. The track number, which can be a graycoded track-number, can later be used by the servo to determine the coarse radial position of the read/write (R/W) head. Following the track number, the head writes one of four servo bursts, in this case what will be referred to as a C-burst, which can later be used by a servo to determine the fine (fractional track) radial position of a R/W head. The number of servo bursts used can vary with servo pattern. The burst that is written can be, for example, the one that is in-line with the digital information. The width of the written track can be determined by the magnetic write-width of the write element of the servowriting head.

Figure 4B:
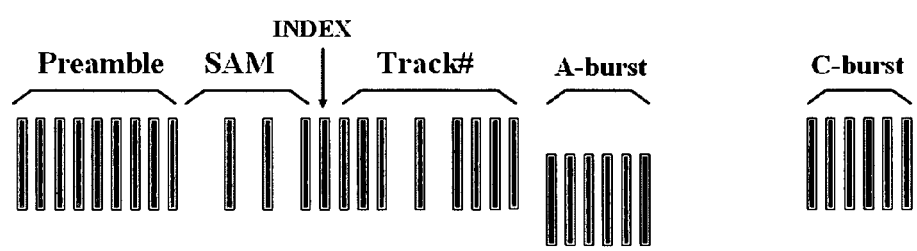

FIG. 4B shows the result of a second step of the servowriting process. All that has been added in the second step is an additional burst, in this case referred to as an A-burst. The A-burst is displaced longitudinally from both the digital information and the C-burst, to prevent any overlap in the longitudinal direction. The A-burst is also displaced by approximately one-half of a servo-track in the radial direction.

Figure 4C:
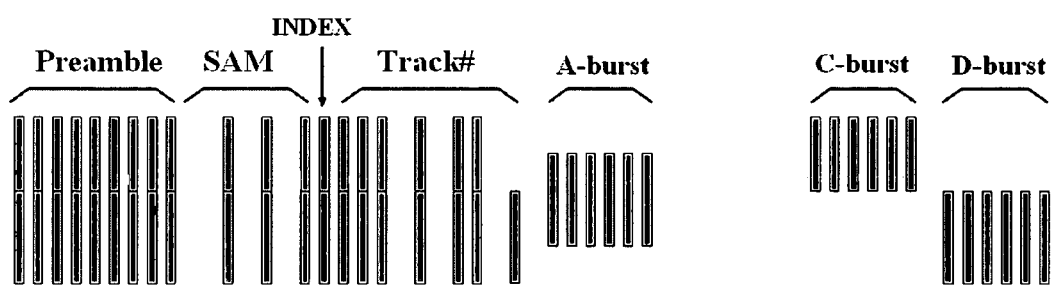

FIG. 4C shows the magnetization pattern after three steps of the servowriting process. The new portion of the pattern has been written with the servowriting head displaced another half servo track radially, for a total displacement of one servo-track, or two-thirds of a data-track, from the position of the head during the first pass. New digital information has been written, including the same preamble, SAM, and INDEX-bit, as well as a new track number. A D-burst was added during the third servowriting step, and the C-burst was "trimmed." The C-burst was trimmed by "erasing" the portion of the C-burst under the servowriting head as the head passed over the burst on the third servowriting step. This trimming of the C-burst and writing of the D-burst created a common edge position or "boundary" between the two bursts.

Figure 4D:
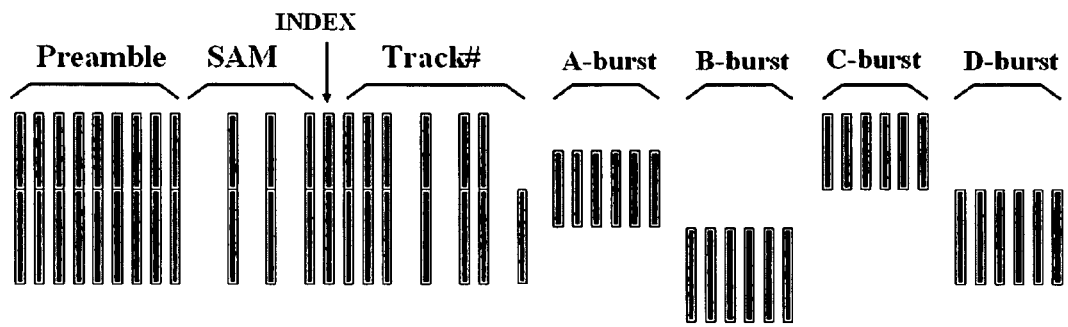

In FIG. 4D, a B-burst has been added and the A-burst trimmed in the fourth step of the servowriting process. At a point in time after the servowriting is complete, such as during normal operation of the disk drive, the upper edge of the B-burst and the lower edge of the A-burst can be used by the servo, along with the graycoded track-number whose radial center is aligned with the burst edges, to determine the R/W head position when it is in the vicinity of the center of that servo track. If a reader evenly straddles the A-burst and the B-burst, the amplitude of the signals from the two bursts will be approximately equal and the fractional Position-Error Signal (PES) derived from those bursts will be about 0. If the reader is off-center, the PES will be non-zero, indicating that the amplitude read from the A-burst is either greater than or less than the amplitude read from the B-burst, as indicated by the polarity of the PES signal. The position of the head can then be adjusted accordingly. For instance, negative PES might indicate that the amplitude read from the A-burst is greater than the amplitude read from the B-burst. In this case, the head is too far above the center position (using the portion of the pattern in the FIG.) and should be moved radially downward/inward until the PES signal is approximately 0. It should be noted that for other portions of the pattern a B-burst could be above an A-burst, resulting in a negative amplitude contribution coming from the A-burst. Other burst-demodulation schemes have been proposed which determine the PES as a function of more than two burst amplitudes. Three examples of such schemes are disclosed in U.S. Pat. No. 6,122,133, U.S. Pat. No. 5,381,281, and U.S. Pat. No. 5,781,361, which examples are incorporated herein by reference. Such schemes would also benefit from the current invention.

Figure 4E:
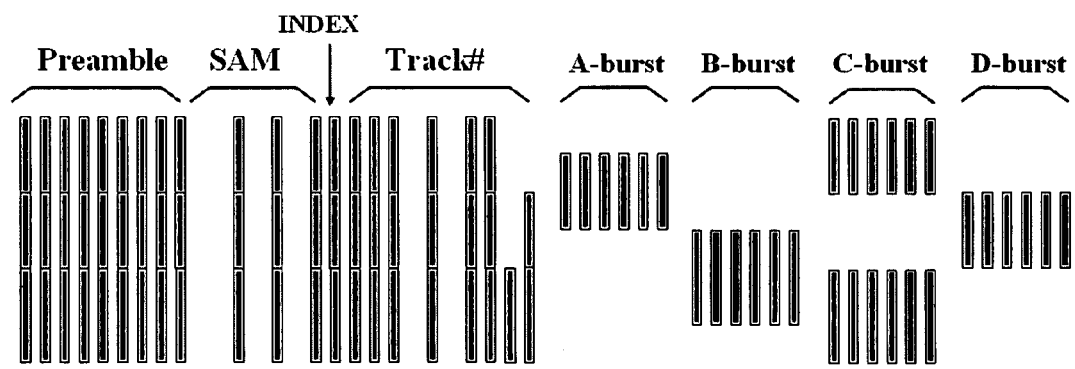
Figure 4F:
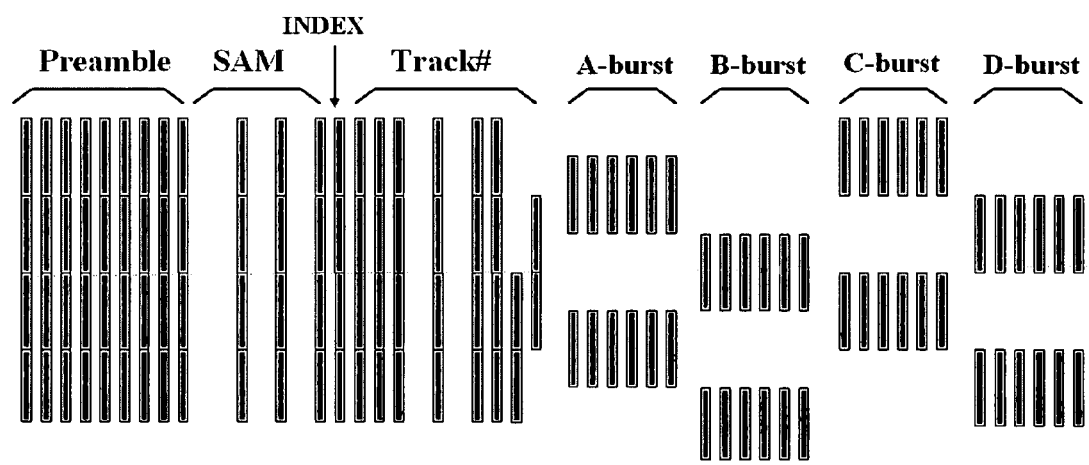

FIGS. 4E and 4F show the results of subsequent steps of the servowriting process, which has produced a number of servo tracks. After the first step in this process, each subsequent step writes one servo burst in a wedge and trims another. Every second step also writes digital information, including, e.g., the SAM and track number. Between servowriting steps, the servowriting head is stepped by one-half servo track radially, either toward the inner diameter (ID) or outer diameter (OD) of the disk, depending on the radial direction used to write the servo information. A seek typically takes anywhere from one quarter to one half of the time it takes for the disk to make one revolution. The process of writing the servo pattern for each servowriting step typically takes one full revolution to write all of the wedges for that step. Using this algorithm, then, servowriting can take about 1.25 to 1.5 revolutions per servowriting step. Since there are two servowriting steps per servo-track in this example, and 1.5 servo tracks per data-track, such a process requires 3 servowriting steps per data-track, or 3.75 to 4.5 revolutions per data-track. For purposes of subsequent discussion only, it will be assumed that the process takes 4 revolutions per data-track.

A disk drive can have tens of thousands of data tracks. With 100,000 data-tracks and a spin-speed of 5400 RPM (90 Hz), for example, the process would take 4,444 seconds, or about 75 minutes. If the process is carried out on an expensive servowriter, this can add substantially to the cost of the drive. Thus, drive manufacturers are motivated to use self-servowriting techniques to reduce or eliminate the time that a drive must spend on a servowriter.

One such technique uses a media-writer to write servo patterns on a stack of disks. Each disk is then placed in a separate drive containing multiple blank disks, such that the drive can use the patterned disk as a reference to re-write servo patterns on all of the other disk surfaces in the drive, as well as writing a servo pattern on the patterned surface, if desired. The media-writer can be an expensive instrument, and it may still take a very long time to write a reference pattern on the stack of disks. However, if a stack contains 10 blank disks, for example, then the media-writer can write the reference pattern for 10 drives in the time that it would have taken to servowrite a single drive. This scheme is a member of a class of self-servowriting techniques commonly known as "replication" self-servowriting.

A typical replication process, in which a drive servos on the reference pattern and writes final servo patterns on all surfaces, takes place while the drive is in a relatively inexpensive test-rack, connected to only a power-supply. The extra time that it takes is therefore usually acceptable.

Another class of self-servowriting techniques is known as "propagation" self-servowriting. Schemes in this class differ from those in the "replication" class in the fact that the wedges written by the drive at one point in the process can later be used as reference wedges for writing other tracks. These schemes are thus "self-propagating". Typically, such schemes require a R/W head that has a large radial offset between the read and write elements, so that the drive can servo with the read element over previously-written servo wedges while the write element is writing new servo wedges. In one such application, a servowriter is used for a short time to write a small "guide" pattern on a disk that is already assembled in a drive. The drive then propagates the pattern across the disk. An example of such a scheme is disclosed in U.S. Pat. No. 6,631,046, incorporated herein by reference, In this type of self-servowriting operation, previously written tracks can later serve as reference tracks.

Many of the self-servowriting techniques, including those described above, require considerably more than four disk revolutions per data-track written, as the drive must spend considerable time at the start of each servowriting step determining the written-in runout of the corresponding reference track, so that the servowriting head can be prevented from following that runout while writing the final servo pattern. Techniques exist which allow tracks of servo information to be made substantially circular, despite the fact that the reference information is not perfectly circular.

The information used to remove written-in runout from the track can be calculated, in one approach, by examining a number of parameters over a number of revolutions. These parameters can include wedge offset reduction field (WORF) data values. WORF data can be obtained, for example, by observing several revolutions of the position error signal (PES) and combining the PES with servo loop characteristics to estimate the written-in runout, such as of the reference track. It is also possible to synchronously average the PES, and combine the synchronously-averaged PES with servo loop characteristics to estimate the written-in runout. Various measurements can be made, as are known in the art, to characterize servo loop characteristics. Because the servo typically suffers both synchronous and non-synchronous runout, any measurement intended to determine the synchronous runout will be affected by the non-synchronous runout. If many revolutions of PES data are synchronously averaged, the effects of the non-synchronous runout can lessen, leaving substantially only synchronous runout. This allows better determination of, and subsequent elimination of, the written-in runout. Averaging many revolutions of PES data, however, can add significantly to the time required for determination of the written-in runout. Process engineers may need to balance the cost and benefit of additional revolutions of PES data collection in determination of WORF values.

The computed written-in runout values for each servo wedge can be written into the servo wedges themselves for later use by the servo, or can be kept in drive microcontroller memory for immediate use. During a self-servowriting operation, the drive may use the latter option by calculating the written-in runout on a reference track and applying it to the servo by the use of a table in microcontroller memory. Additional revolutions of PES measurements for the reference track can be used to reduce the effects of non-synchronous, or repeatable, runout.

As previously described, techniques for determining and removing written-in runout of a track will hereinafter be referred to as WORF technology. If, for example, a drive spends 5 revolutions to determine the written-in runout of each reference track before writing the corresponding final wedges, that would add 15 revolutions to the writing time of each data-track (5 extra revolutions per servowriting step, times 3 servowriting steps per data-track), bringing the total time per data-track to 19 revolutions.

Even though the self-servowriting time may be as much as about five times as long as the time necessary to servowrite a drive on a servowriter (19 revolutions/data-track, versus 4 revolutions/data-track), self-servowriting is likely to be a less expensive alternative due to the expense of servowriters, as well as the fact that servowriting operations on a servowriter generally must be performed in a cleanroom environment. Also, as track-densities get higher it becomes more difficult for an external device such as an actuator push-pin to control the position of the R/W heads accurately enough to produce a servo pattern with sufficiently small written-in runout. The expense of servowriting also rises in proportion to the number of tracks on a drive.

Trimmed vs. Untrimmed Servo Patterns

As explained in U.S. Pat. No. 6,519,107, which is incorporated herein by reference, an initial issue confronting a disk drive designer is whether to employ "trimmed bursts" or "untrimmed bursts". A trimmed servo burst is one in which a radial edge of the burst is DC erased during a subsequent pass of the write element at a displaced radial position relative to the disk, as was described above with references to FIGS. 4A–4F. An untrimmed servo burst, on the other hand, is one in which radial edges of bursts are not DC erased during a subsequent pass of the write element, resulting in burst pairs (e.g., A and B burst pairs) either radially overlapping or underlapping each other.

An obvious advantage of trimmed bursts are that they provide for a well defined track center. However, as is explained in U.S. Pat. No. 6,519,107, repeatable runout error (RRO) can be significantly reduced by using untrimmed burst patterns is used in lieu of single pass trimmed burst patterns. More specifically, it is believed that the burst null point for an untrimmed burst pattern is determined by non-repeatable runout error (NRRO) of two different servowriting passes (one pass for each burst written), while the burst-null-point for a trimmed pattern is determined by the NRRO of a single pass (wherein the write element trims one burst and writes another burst). While trimmed-burst patterns could be written in a way to reduce its RRO by requiring two passes for each burst (i.e., one pass to trim the previous burst and a second pass to write the burst), such an approach, if executed on a servowriter or media-writer, would nearly double the servowriting time.

Additionally, as will now be described with references to FIGS. 5A and B and FIGS. 6A and B, untrimmed servo burst patterns will typically increase the non-flat usable region of a PES curve. FIG. 5A shows A and B bursts that have been written using a R/W head 504, which includes a write element 506 and a magneto-resistive (MR) read element 505. In the trimmed burst pattern shown in FIG. 5A, the servo burst A has a lower radial edge which has been trimmed (the portion of the A-burst enclosed in the dashed line block has been DC erased) to be in approximate alignment with the upper radial edge of an adjacent B-burst. The resulting computed PES can be zero if the radial location defined by the A-burst/B-burst (A/B) combination, or A/B boundary, is the center of a data track, or a track centerline.

FIG. 5B graphs a PES which is linear as a function of radial offset of the MR read element 505 about a centerline (A–B) passing through the approximately aligned edges of the trimmed A and C bursts. If the write element 506 is about one servo track wide, then the PES linearity signal should be about the same for trimmed or untrimmed servo bursts. However, for write elements, which have electrical writing widths greater or less than about one servo track width, the useable portion of the PES curve is larger for untrimmed bursts. FIGS. 5A and 5B show the A–B PES as a function of radial displacement of the MR read element 505 for the two trimmed bursts A and B. The idealized curve presented as FIG. 5B has a linear portion, bounded on both sides by flat lines. The useable portion of the FIG. 5B curve is simply the linear portion of the curve.

FIGS. 6A and 6B show an equivalent situation for untrimmed bursts A and B, written using a R/W head 604, which includes a write element 606 and a read element 605. The linear portion of the FIG. 6B curve, centered about A–B=0, is smaller than that of the trimmed burst pattern, but the useable, non-flat portion of the FIG. 6B curve extends over a larger radial displacement of the MR read element 605 relative to the disk. Thus, if a PES linearization method is used to re-linearize the PES within the drive servo loop, then the FIG. 6A untrimmed burst pattern has a larger useable region. An exemplary manufacturing process for determination of a PES linearization table, which is disclosed in U.S. Pat. No. 6,369,971 (Everett), is incorporate by reference. Other PES linearization schemes are also available, such as, but not limited to, those disclosed in U.S. Pat. No. 5,982,173 (Hegan). While FIGS. 6A and 6B show overlapped untrimmed A and B bursts, similar reductions in the RRO and increases in the non-flat usable PES region are achieved if the untrimmed A and B bursts underlap.

Servo Burst Patterns Including Trimmed/Untrimmed Bursts Groups

As described in U.S. patent application Ser. No. 10/923, 662, entitled SYSTEMS AND METHODS FOR REPAIRABLE SERVO BURST PATTERNS, filed Aug. 20, 2004, which is incorporated herein by reference, many self-servowriting techniques, such as the one described above with reference to FIGS. 4A–4F require a three or more step-per-track servowriting process to provide a more linear (or at least, a linearizable) PES at all locations along a track. As will be described below, specific embodiments of the present invention enable servo burst patterns to be written during a two-step-per-track servowriting process (also known as a two-pass-per-track scheme), which is preferred to a three or more -step-per-track scheme, because the less steps per track, the faster the servo information can be written onto a disk.

A major impediment to using typical two-step-per-datatrack servo patterns is that such patterns often cause servoing difficulties at some positions between write-track-centers, due to non-linearities in the PES (because an MR read element that is significantly narrower than 50% of a datatrack width). Certain embodiments of the present invention reduce such servoing difficulties by replacing each burst, in a typical 4-burst servo pattern, with two bursts. More specifically, in specific embodiments of the present invention discussed below with reference to FIGS. 7 and 8, each burst of a 4-burst servo pattern is replaced with a one typical trimmed (and stitched) burst, and one un-trimmed burst. Such a pattern should take the same time to write (in terms of disk-revolutions per data-track) as a conventional two-servowriting-step-per-data-track pattern, but should provide an increased useable PES range. It is likely that a PES-linearization scheme should be applied to linearize the PES. Alternatively or additionally, the PES obtained from "trimmed/trimmed" servo burst-pairs, and the PES obtained from "trimmed/untrimmed" servo burst-pairs, can be linearized separately.

Figure 7A:
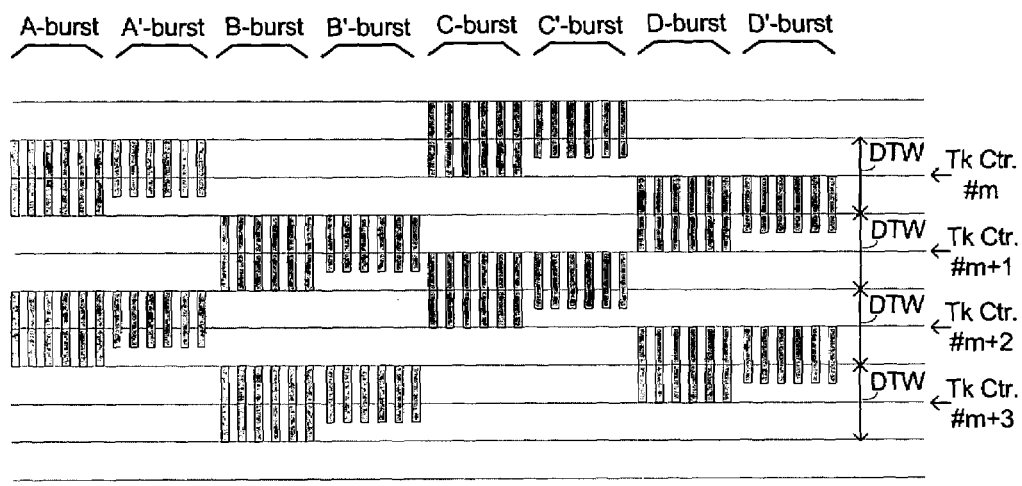
FIG. 7A illustrates a servo-burst pattern according to certain embodiments of the present invention.

Referring now to FIG. 7A, an embodiment of a combined trimmed and untrimmed servo burst pattern is shown. For the sake of simplicity, the digital information associated with each servo wedge (such as the preamble, SAM, INDEX-bit, track number) is not shown. As can be appreciated from FIG. 7A, each A-burst has an associated A'-burst (collectively referred to as an A/A' burst group), each B-burst has an associated B'-burst (collectively referred to as a B/B' burst group), each C-burst has an associated C'-burst (collectively referred to as a C/C' burst group), and each D-burst has an associated D'-burst (collectively referred to as a D/D' burst group). In this embodiment, the A, B, C and D bursts are bursts that are typically seen in a trimmed-burst, two-servowriting-step-per-data-track servo pattern; and the A', B', C' and D' bursts are what may be seen in an untrimmed-burst, two-servowriting-step-per-data-track servo pattern. In accordance with embodiments of the present invention, the benefits of both trimmed-burst patterns and untrimmed-burst patterns are realized by providing a servo pattern that includes both trimmed and untrimmed bursts, e.g., as shown in FIG. 7A.

Figure 7B:
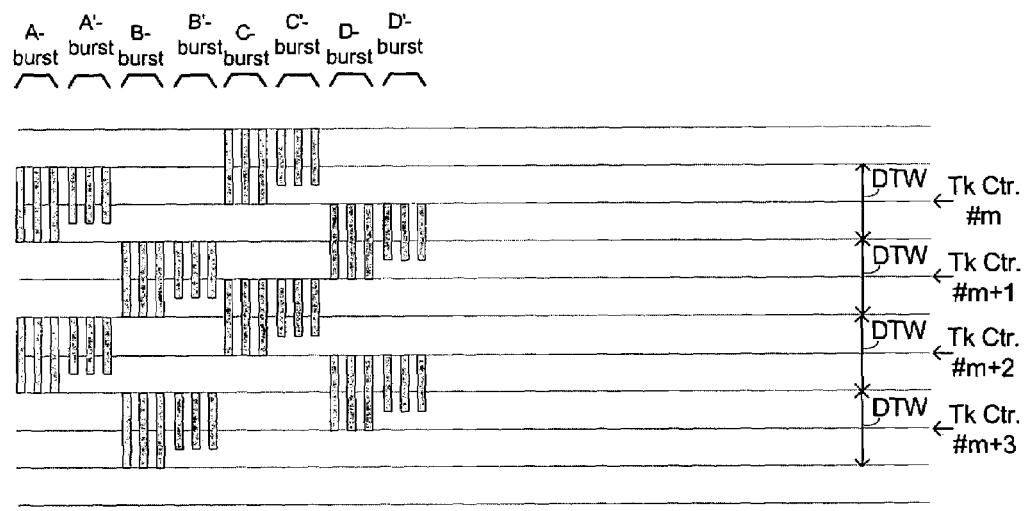
FIG. 7B illustrates a servo-burst pattern that is similar to the one shown in FIG. 7A, but with each servo-burst being circumferentially shorter (i.e., less thick), according to certain embodiments of the present invention.

If the size (i.e., longitudinal thickness) of each burst is kept the same as in a typical 4-burst pattern, then each servo-burst pattern will take up more room, thereby reducing some of the room on each track that is available for data. An example of this is shown in FIG. 7A. Alternatively, each burst thickness can be shortened (e.g., halved), such that each burst group (e.g., the A/A' burst group) occupies the same time as a typical burst. An example of this is shown in FIG. 7B, where each burst occupies half the time of the bursts shown in FIG. 7A. It is noted that reducing the time of individual bursts (e.g., the A-burst and the A'-burst) may increase PES noise. However, this will not likely cause a problem since PES noise is not presently a significant problem, as it causes only a small fraction of the total NRRO. Also, in many cases, a usable PES can be obtained from both the trimmed and un-trimmed bursts, so that it is possible that the overall PES noise (resulting from a combined PES) will have similar PES noise to that of a more typical pattern which occupies the same total burst time.

Still referring to FIGS. 7A and 7B, in accordance with specific embodiments, each of the trimmed bursts A, B, C and D is stitched and trimmed such that it has a width that is substantially equal to 1 data track width (DTW), and each of the untrimmed bursts A', B', C' and D' has a width that is about ½ to ⅞ of a DTW. In accordance with specific embodiments, the trimmed and untrimmed bursts are aligned as follows. A lower edge of the trimmed burst A is substantially radially aligned with an upper edge of the trimmed burst B; a lower edge of the trimmed burst C is substantially radially aligned with an upper edge of the trimmed burst D; the lower edge of the trimmed burst A is preferably radially offset from the lower edge of the trimmed burst C by substantially ½ of a DTW; and the lower edge of the trimmed burst B is preferably radially offset from the lower edge of the trimmed burst D by substantially ½ of a DTW. Additionally, within each burst group, an upper edge of the trimmed burst and an upper edge of the untrimmed burst are substantially radially aligned, and a lower edge of the trimmed burst and a lower edge of the untrimmed burst are radially offset by at least ⅛ of a DTW. Alternatively, within each burst group, an upper edge of the trimmed burst and an upper edge of the untrimmed burst are radially offset by at least ⅛ of a DTW, and a lower edge of the trimmed burst and a lower edge of the untrimmed burst are substantially radially aligned. While it is preferred that within a same burst group, that an edge of the trimmed burst and a corresponding edge of the untrimmed burst is at least ⅛ of a DTW, it is believed that offsets of as little as 1/16 of a DTW (and possibly less) should provide benefits.

Still referring to FIGS. 7A and 7B, in accordance with specific embodiments, a lower edge of the untrimmed burst A' is radially offset from an upper edge of the untrimmed burst B' by about ⅛ to ⅜ of a DTW; and a lower edge of the untrimmed burst C' is radially offset from an upper edge of the untrimmed burst D' by about ⅛ to ⅜ of a DTW.

In FIGS. 7A and 7B, the trimmed burst and untrimmed burst of each burst pair are shown as being adjacent one another. However, in alternative embodiments this is not necessary. For example, the trimmed A burst need not be adjacent the untrimmed A' burst; the trimmed B burst need not be adjacent the untrimmed B' burst; etc.

FIGS. 8A–8I will now be used to describe a two-step-per-track servowriting process (also known as a two-pass-per-track scheme), according to an embodiment of the present invention, that can be used to produce the servo burst pattern of FIG. 7A. For the sake of simplicity, the digital information is not shown. It is also assumed for the following description that the width of the write element 806, and the current provided to the write element 806, are such that the write element 806 writes bursts that are ¾ of a data track width (DTW), however this need not be the case. All that is preferred for the embodiment of FIGS. 8A–8I, is that the write element write bursts that are between ½ and 1 DTW. It is also assumed in FIGS. 8A–8I that the disk surface is spinning under the write element 806 such that the write element 806 writes from left to right in the FIGS.

In FIG. 8A, the write element 806 in an nth servowriting step: writes an upper portion of a C-burst and an entire C'-burst.

In FIG. 8B, after the write element 806 (along with the entire W/R head) is moved radially (e.g., downward) by one-half of a DTW, in the servowriting step n+1: an upper portion of an A-burst is written; an entire A'-burst is written; and a further portion of the C-burst is written, thereby creating a stitched C-burst. Note that in this embodiment, the C'-burst in unaffected at this step.

In FIG. 8C, after the write element 806 is again moved radially by one-half of a DTW, at the servowriting step n+2: a further portion of the A-burst is written, thereby creating a stitched A-burst; the A'-burst is unaffected; a lower portion of the stitched C-burst is trimmed, causing the trimmed C-burst to have a width substantially equal to a DTW; an upper portion of a D-burst is written; and an entire D'-burst is written.

In FIG. 8D, after the write element 806 is moved radially by one-half of a DTW, at the servowriting step n+3: a lower portion of the stitched A-burst is trimmed, causing the trimmed A-burst to have a width substantially equal to a DTW; an upper portion of a B-burst is written; an entire B'-burst is written; and a low portion of the D-burst is written, thereby creating a stitched D-burst; the D'-burst is unaffected.

In FIG. 8E, after the write element 806 is moved radially by one-half of a DTW, at the servowriting step n+4: a further portion of the B-burst is written; the B'-burst is unaffected; an upper portion of another C-burst is written; another entire C'-burst is written; and a lower portion of the stitched D-burst is trimmed, causing the trimmed D-burst to have a width substantially equal to a DTW.

In FIG. 8F, after the write element 806 is moved radially by one-half of a DTW, at the servowriting step n+5: an upper portion of another A-burst is written; another entire A'-burst is written; a lower portion of the stitched B-burst is trimmed, causing the trimmed B-burst to have a width substantially equal to a DTW; a further portion of the second C-burst is written, thereby creating a second stitched C-burst; the second C'-burst is unaffected.

As can be appreciated from FIGS. 8G–8I, in manners similar to those just described above, the second A-burst/

A'-burst group is completed, and the second B-burst/B'-burst group and D-burst/D'-burst group are written at steps n+6, n+7 and n+8.

Each above described servowriting step can include one or multiple servowriting passes and each track of a disk can be defined by one or multiple servowriting steps. For example, in some embodiments a servowriting step can include one pass for both writing and trimming servo information. In other embodiments, a servowriting step can include a first pass for writing servo information and a second pass for trimming servo information. In accordance with some embodiments, the servo information to be written and/or trimmed during a pass of a servowriting step may be written and/or trimmed in one or multiple revolutions of the disk. A pass need not include an integer number of revolutions of the disk. Passes or steps can be completed at any point during a revolution of the disk and passes or steps can begin at any point during a revolution of the disk.

The burst patterns shown in FIGS. 7A and 7B, and explained with reference to FIGS. 8A–8I can be written using 2 servowriting steps per data-track, which takes less time than 3 servowriting steps per data-track. Also, because of the added burst boundaries provided by the A'-bursts, the B'-bursts, the C'-burst and the D'-bursts, smaller read elements can be used to read the servo burst patterns while still providing for an acceptable PES. Smaller read elements may allow for looser tolerances when building disk drives, meaning less read elements would need to be discarded during manufacture. Additionally, smaller read elements are less affected by track misregistration (TMR). Additionally, these burst patterns provide for more burst pairs from which amplitude differences can be determined for the purpose of determining a data track center. Stated another way, the benefits of an 8 burst pattern are achieved while using the same amount of steps used to write a typical 4 burst pattern.

In FIGS. 8A–8I, and the discussion thereof, the trimmed and untrimmed bursts of each burst group were described and shown as being adjacent one another. However, this need not be the case, as was mentioned above. One of ordinary skill in the art, based on the description above, would understand how such alternative types of burst patterns could be written (e.g., one where the trimmed A-burst and untrimmed A'-burst are not written adjacent to one another; the trimmed B-burst and untrimmed B'-burst are not written adjacent one another; etc.).

Servo Burst Patterns Including Untrimmed Burst Groups

Figure 9:
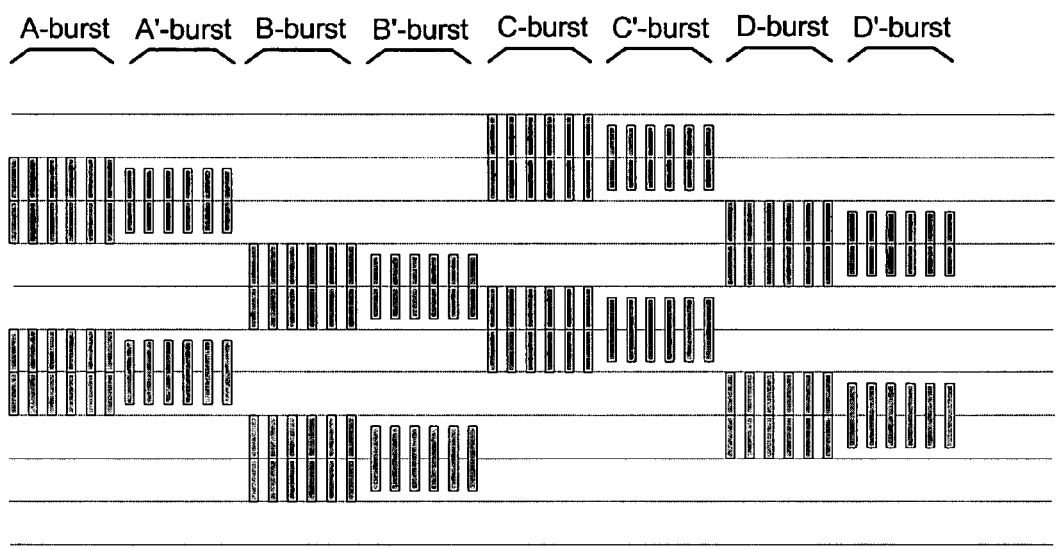
FIG. 9 illustrates a servo-burst pattern according to certain other embodiments of the present invention.

Referring now to FIG. 9, a burst pattern including untrimmed burst groups is shown. For the sake of simplicity, the digital information associated with each servo wedge (such as the preamble, SAM, INDEX-bit, track number) is not shown. As can be appreciated from FIG. 9, each A-burst has an associated A'-burst (collectively referred to as an A/A' burst group), each B-burst has an associated B'-burst (collectively referred to as a B/B' burst group), each C-burst has an associated C'-burst (collectively referred to as a C/C' burst group), and each D-burst has an associated D'-burst (collectively referred to as a D/D' burst group). In this embodiment, all of the bursts are untrimmed bursts.

If the size (i.e., longitudinal extent) of each burst is kept the same as in a typical 4-burst pattern, then each servo-burst pattern will take up more room, thereby reducing some of the room on each track that is available for data. Alternatively, each burst time can be shortened (e.g., halved), such that each burst group (e.g., the A/A' burst group) has roughly the same longitudinal extent as a typical burst, in a similar manner as was discussed above with regards to FIG. 7B. In still another embodiment (not shown), each burst is shortened (but not halved) such that each burst group (e.g., the A/A' burst group) has a longitudinal extent that is greater than a typical burst, but less than a pair of typical bursts.

Referring to FIG. 9, in accordance with specific embodiments, a lower edge of the untrimmed burst A is substantially radially aligned with an upper edge of the untrimmed burst B; a lower edge of the untrimmed burst C is substantially radially aligned with an upper edge of the untrimmed burst D; the lower edge of the untrimmed burst A is radially offset from the lower edge of the untrimmed burst of the burst C by substantially ½ of a DTW; and the lower edge of the untrimmed burst B is radially offset from the lower edge of the untrimmed burst D by substantially ½ of a DTW. Still referring to FIG. 9, in accordance with specific embodiments, within each burst group, an upper edge of one untrimmed burst and an upper edge of the other untrimmed burst are preferably radially offset by about ⅛ to ¼ of a DTW. Additionally, a lower edge of one untrimmed burst and a lower edge of the other untrimmed burst are preferably radially offset by about ⅛ to ¼ of a DTW. The offsets that can be achieved between an edge of one untrimmed burst and a corresponding edge of another untrimmed burst within a: same burst group is dependent upon the variation of write widths that can be achieved by adjusting write currents, and is thus dependent upon disk drive design and implementation. Accordingly, while it is preferred that within a same burst group, that an edge of one untrimmed burst and a corresponding edge of the other untrimmed burst is at least ⅛ of a DTW, such offsets may not be achievable in certain drives. Nevertheless, it is believed that offsets of as little as 1/16 of a DTW (and possibly less) should provide benefits.

Still referring to FIG. 9, in accordance with specific embodiments, a lower edge of the untrimmed burst A' is preferably radially offset from an upper edge of the untrimmed burst B' by about ¼ to ½ of a DTW; and a lower edge of the untrimmed burst C' is preferably radially offset from an upper edge of the untrimmed burst D' by about ¼ to ½ of a DTW.

Because the bursts in the pattern shown in FIG. 9 are all untrimmed, it may be difficult to accomplish specific radial alignments between the burst edges of one burst group and burst edges of another burst group. Accordingly, in accordance with other embodiments, all that is necessary is that there is a significant radial offset between the burst edges of one untrimmed burst and the other untrimmed burst within each burst group. For example, within each burst group, an upper edge of one untrimmed burst and an upper edge of the other untrimmed burst are preferably radially offset by at least ⅛ a DTW. Additionally, a lower edge of one untrimmed burst and a lower edge of the other untrimmed burst, within each burst group, are preferably radially offset by at least ⅛ of a DTW. Accordingly, such embodiments should not be limited to the precise burst alignments shown in FIG. 9.

In FIG. 9, the two untrimmed bursts of each burst group are shown as being adjacent to one another. However, in an alternative embodiment they are not. For example, in an alternative embodiment the untrimmed A-burst and untrimmed A'-burst are not adjacent to one another; and the untrimmed B-burst and untrimmed B'-burst are not adjacent to one another, etc.

FIGS. 10A–10D will now be used to describe a two-step-per-track servowriting process (also known as a two-pass-per-track scheme), according to an embodiment of the present invention, that can be used to produce the servo burst pattern of FIG. 9. For the sake of simplicity, the digital information is not shown. It is also assumed for the following description that the width of the write element (not shown), and the current provided to the write element, are such that the write element can write bursts that are substantially equal to a data track width (DTW), and that the current can be reduced so that the write element can write bursts less than a DTW (preferably, about ¾ of a DTW). It is also assumed in FIGS. 10A–10D that the disk surface is spinning under the write element such that the write element writes from left to right in the FIGS.

In FIG. 10A, the write element in an nth servowriting step: writes a C-burst using a first write current, and writes a C'-burst using a second write current that is less than the first write current. In FIG. 10B, after the write element (along with the entire W/R head) is moved radially (e.g., downward) by one-half of a DTW, in the servowriting step n+1: an A-burst is written using the first write current, and an A'-burst is written using the second write current. In FIG. 10C, after the write element (along with the entire W/R head) is moved radially (e.g., downward) by one-half of a DTW, in the servowriting step n+2: a D-burst is written using the first write current, and a D'-burst is written using the second write current. In FIG. 10D, after the write element (along with the entire W/R head) is moved radially (e.g., downward) by one-half of a DTW, in the servowriting step n+3: a B-burst is written using the first write current, and a B'-burst is written using the second write current.

Each above described servowriting step can include one or multiple servowriting passes and each track of a disk can be defined by one or multiple servowriting steps. For example, in some embodiments a servowriting step can include one pass for both bursts of a burst group (e.g., the A and the A' bursts of the A/A' burst group). For this to be accomplished, the current preamp must be able to adjust currents very quickly. In other embodiments, a servowriting step can include a first pass for writing one of the bursts of a burst group (e.g., the A-burst) and a second pass for writing a second burst (e.g., the A'-burst) of the burst group. In accordance with some embodiments, the servo information to be written during a pass of a servowriting step may be written in one or multiple revolutions of the disk. A pass need not include an integer number of revolutions of the disk. Passes or steps can be completed at any point during a revolution of the disk and passes or steps can begin at any point during a revolution of the disk.

In FIGS. 10A–10I, and the discussion thereof, the untrimmed pairs of bursts of each burst group were described and shown as being adjacent one another. However, this need not be the case, as was mentioned above. One of ordinary skill in the art, based on the description above, would understand how such alternative types of burst patterns could be written (e.g., one where the untrimmed A-burst and untrimmed A'-burst are not written adjacent to one another; the untrimmed B-burst and untrimmed B'-burst are not written adjacent one another; etc.).

The burst patterns shown in FIGS. 9, and explained with reference to FIGS. 10A–10D can be written using 2 servowriting steps per data-track, which takes less time than 3 servowriting steps per data-track. Also, because of the added burst boundaries provided by the A'-bursts, the B'-bursts, the C'-burst and the D'-bursts, smaller read elements can be used to read the servo burst patterns while still providing for an acceptable PES. As mentioned above, smaller read elements may allow for looser tolerances when building disk drives, meaning less read elements would need to be discarded during manufacture. Additionally, smaller read elements are less affected by track misregistration (TMR). Additionally, these burst patterns provide for more burst pairs from which amplitude differences can be determined for the purpose of determining a data track center. Stated another way, the benefits of an 8 burst pattern are achieved while using the same amount of steps used to write a typical 4 burst pattern.

Adjusting Write Currents to get Desired Write Widths

Figure 11A:
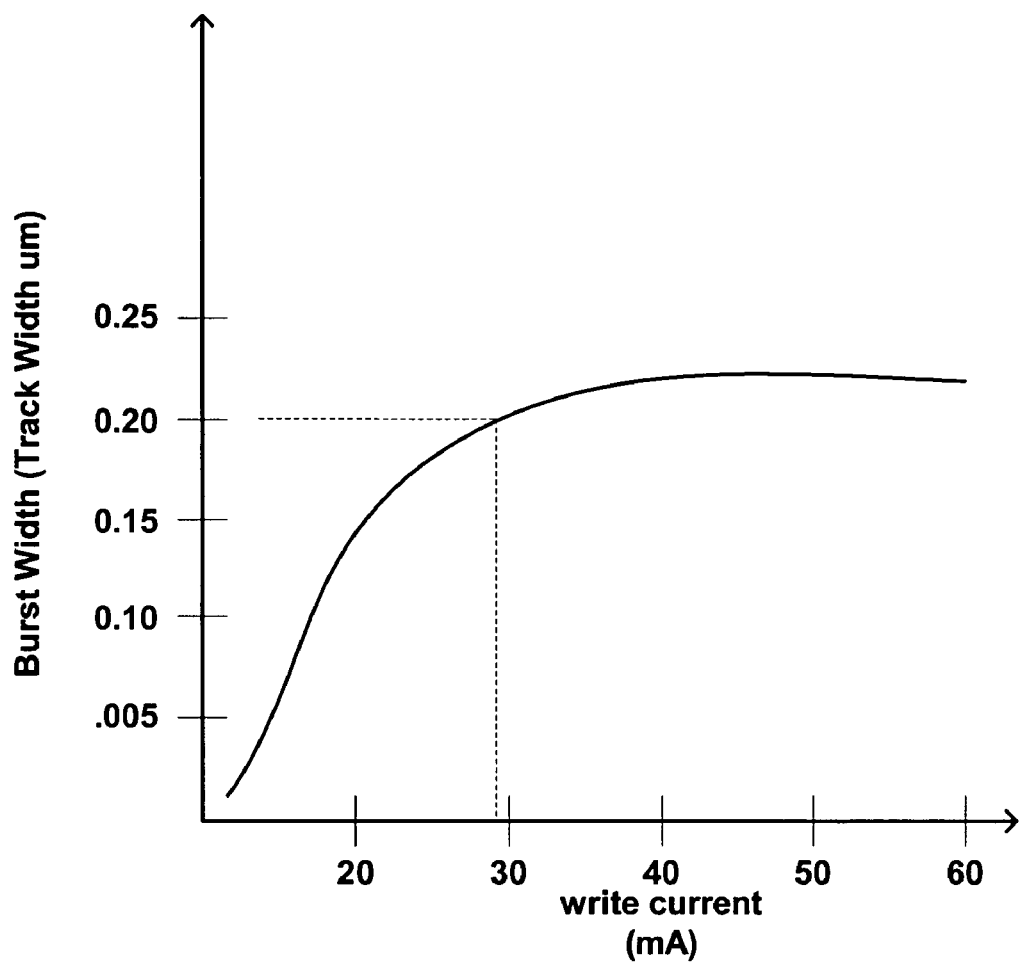
FIG. 11A is an exemplary plot showing the variation of burst width as a function of write-current for a write element.
Figure 11B:
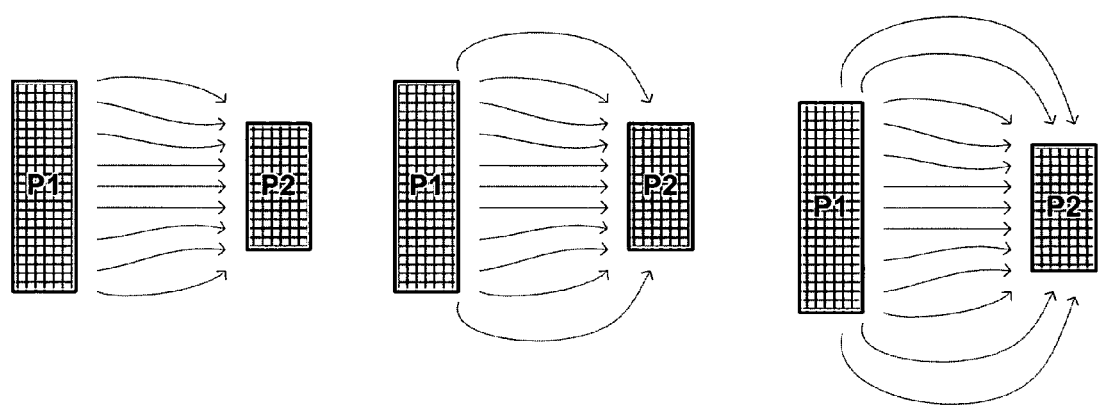
FIG. 11B is a diagram schematically illustrating how a write-head's magnetic field lines beyond a specified field-strength vary with write current.

FIGS. 11A and 11B will now be used to describe how write currents can be adjusted to produce untrimmed servo bursts having desired widths. As shown in the exemplary graph of FIG. 11A, the written burst width produced by a write element varies with write current. The dashed line in FIG. 11A illustrates how a write current can be selected to produce a burst width that is a desired width. A table or graph similar to FIG. 11A can be produced for each write element (e.g., during calibration), and then a precise write current can be selected to achieve desired burst widths. The precisely selected write current can be used to produce final burst patterns in a media-writer (i.e., the write currents of write elements in media-writers can be controlled to produce the desired servo burst width). In accordance with another embodiment of the present invention, a precisely selected write current is used to produce the desired servo burst width (BW) during servo-writing performed by a servowriter (e.g., in a clean room). In still another embodiment, a precisely selected write current is used to produce the desired servo burst width during self-servo writing.

Various calibration procedures can be used to calibrate a write element. In accordance with an embodiment of the present invention, a write element can be calibrated in order to determine the width of a burst written by the write element as a function of write current. The location of a write element can be determined by observing a reference pattern. Such reference patterns can include, but are not limited to, patterns written to one surface of a rotatable media by a media-writer, printed-media patterns, or portions of final servo patterns written by a drive during an earlier portion of an ongoing self-servowriting operation. Calibrated quantities can vary from element to element, and from drive to drive. Write widths can also vary, for example, as a function of radius skew angle of the head and/or temperature, such that it may not be enough to simply calibrate a write element by varying write current. If a drive or test-process setup does not include the capability to measure temperature, it may be necessary to operate with a relatively steady power-draw for long enough to attain a steady-state temperature. The calibrated write width as a function of head-number, write-current, temperature, skew angle and radius can be recorded for later use. This information can be stored, for example, in memory resident in a drive or on the drive itself in a reserved location.

One such calibration process that can be used with embodiments of the present invention utilizes a DC-erase space in the data-area, between servo samples that are used to control the position of a R/W head during this test. A field can be written into this erased space that looks like a servo burst using a specific write-current ($I_0$). A "track-profile" of the burst can be determined, such as by scanning the R/W head radially across the written burst, and measuring the burst amplitude as a function of radial position. The burst amplitude can be measured using whatever circuitry and technique the servo normally uses to demodulate servo bursts. The burst could be written immediately after the bursts normally used by the servo, and the servo demodulation circuitry could be re-programmed to demodulate the burst as if it were an extra servo burst. That burst value may not be used by the servo for controlling the position of a R/W head, but only for calibration purposes. The measured profile, which can be a function of the writer width, the write-current, the reader width, and radius, as well as possibly the media properties and temperature, will typically have a rising portion (as the reader approaches the written burst), a relatively flat portion (where the reader is entirely contained within the written burst), and a falling portion (where the reader is getting out from under the written burst).

These steps can then be repeated using a different write-current ($I_1$). If $I_1$ is larger than $I_0$, then the measured profile should be wider than the original profile. It is likely that the wider profile will have rising and falling portions that are essentially parallel to those of the original burst, but displaced in position. The difference in position of the rising and falling portions of the profile can be recorded as a function of the write current. A table can be constructed that associates the variation of the location of the edges of written bursts (i.e., the displacement of the rising or falling portion of the track profile) with write-current. This process can be repeated at several radial locations for each R/W head. Such a table can be used later, e.g., during a servowriting process. The drive can use an interpolation scheme to determine the variation of burst-width with write-current using the data in the table. Such a table can alternatively be produced and used by a media-writer or servowriter.

Knowing the calibrated write width as a function of write-current (as well as other possible variables) allows a media-writer, servo-writer, or drive (during self servo writing) to produce servo bursts having desired widths, in accordance with embodiments of the present invention.

The illustrations in FIG. 11B are intended to show how magnetic field lines change with write current. Exemplary field line diagrams are shown for three different write currents, with the lowest write current represented in the left most sub-figure and the greatest write current represented in the right most sub-figure. At each current, the flux lines are shown passing from a first pole (P1) to a second pole (P2) of the write element. Each sub-figure shows those field-lines that are of large enough magnetic field to change the magnetization of the media in proximity of the write element. As shown in FIG. 11B, the shape of the field lines may not vary significantly with write current as long as the write element is not saturated, only the magnitude of the flux lines. Even if saturation does occur to some extent, however, the written burst width can still rise monotonically with increasing write current. As such, there is a distance from the head at which the write field decays to a low enough level that it is no longer capable of writing to the media. As the write current is increased, the distance from the write element at which the field is large enough to write to the media increases as well. The width of the written bursts therefore can be seen to rise as a function of the write-current. An illustrative plot of how that burst width (BW) can vary as a function of write current for a given write element was shown in FIG. 11A, which was discussed above. Still referring to FIG. 11B, to the extent that the write element acts in a linear fashion (which is limited, but worth talking about), the field line shapes, themselves, do not change. Rather, the field-strengths just grow in proportion to the applied write current. Thus, as the write current is increased, the regions in which the field-strength is beyond a threshold field-strength (which is large enough to change the magnetization of the media) grows in extent. This is recognizable in FIG. 11B, where the field-lines in the progression of sub-figures are identical to those which are in the same general region as those of an earlier sub-figure, by but with more lines (further out from the poles) as the current grows.

An alternative calibration scheme can be used to determine how the effective centerline of the servowritten track, as determined by the edges of the written bursts, varies with write current. The way in which the centerline of a written track varies with write current can be determined by servowriting a track with different write-currents and measuring the variation of the track-centerline with the write-current. This approach is illustrated in FIG. 12.

Figure 12:
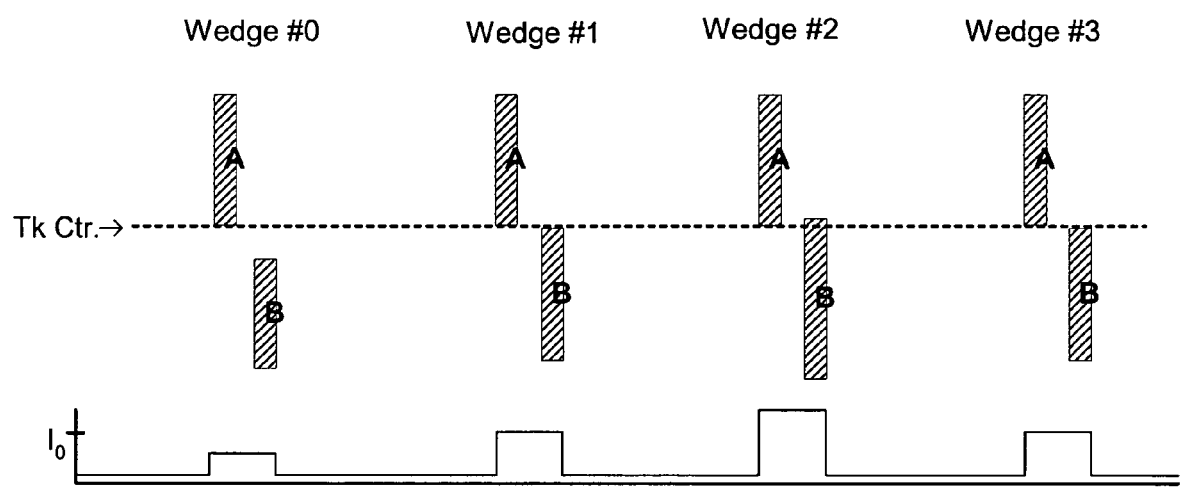
FIG. 12 is a diagram showing a burst pattern that can be used to calibrate a servowriting process in accordance with an embodiment of the present invention.

In FIG. 12, it is assumed for the sake of simplicity that writing with the nominal current would produce untrimmed A and B bursts with the desired spacing (e.g., the lower edge of an A-burst is aligned with an upper edge of a B-burst). It is also assumed for the sake of simplicity that the A bursts are in the correct position when the B bursts are being written. The write-current can then be intentionally varied from wedge to wedge, in a predetermined fashion, to produce a repetitive misplacement of the B bursts. For example, Wedge #0 in FIG. 12 is written with a smaller-than-nominal write current, such that the upper edge of the B burst is below the desired position. Wedge #1 and wedge #3 are written with nominal write currents, and wedge #2 is written with a larger-than-nominal write current, such that the top edge of the B burst extends above the desired position. The misplacement of the bursts written for wedges 0 and 3 can be determined by servoing on the servowritten track and applying RRO reduction techniques, such as those described in the U.S. patent application Ser. No. 10/923,662, which was incorporated by reference.

In fact, the placement of the upper edge of the B bursts will be non-ideal for reasons other than the fact that servowriting is done with varying write-current. Additionally, the lower edges of the A bursts will in practice not be precisely in the ideal position. Even though an attempt can be made to remove the RRO of the original reference pattern before servowriting, the RRO might not get completely removed. Also, the NRRO that the servo is trying to reject can be present during the calibration and "contaminate" the results. The contamination due to RRO in the reference pattern, which is not completely removed by RRO reduction techniques, can be reduced by doing two processes at a time. In a first process, a uniform (nominal) write current can be used to write all wedges. In a second process, the write current can be varied from wedge to wedge in a predetermined fashion. By comparing the results, or computed track centerline placement, of the two processes, the track centerline displacement can better be determined as a function of write current. In order to remove effects of NRRO on the calibration, the above process can be repeated several times. The results of these process repetitions can then be averaged in order to remove the effects of the random NRRO. While the above procedure involved varying the write current to adjust the upper edge of the B bursts, a similar procedure can be used to vary the lower edge of the A bursts, or to adjust the position of other bursts (e.g., C and D bursts).

The pattern shown in FIG. 9, where both the upper and lower edges of each burst within a same burst group are offset from one another, was described as including all untrimmed bursts. In accordance with another embodiment, a pattern similar to that shown in FIG. 9 can be achieved using all trimmed bursts. This can be accomplished by using different write currents for each write-operation and/or different write currents for each trim operation. For example, a greater current can be used to trim an A'-burst than is used to trim an A-burst, thereby resulting in the A'-burst being narrower than the A-burst. A lower current could be used to write the A'-burst than is used to write the A-burst, also resulting in the A'-burst being narrower than the A-burst.

The trimmed bursts of a same burst group (e.g., A and A' bursts) can be circumferentially adjacent to one another (e.g., similar to as in FIG. 9), but this is not necessary. The only thing necessary is that the bursts within a same burst group are written during the same servowriting steps. Preferably, such servo burst patterns are written during a two servowriting steps per data-track servowriting process. In accordance with one embodiment, the servo burst patterns are written such that trimming of the first and second bursts within a same burst group that occur during the same servowriting step occur during a same pass of that step. In another embodiment, the servo burst patterns are written such that trimming of the first and second bursts within a same burst group that occur during the same servowriting step occur during separate passes of that step.

Various different types of servo burst-demodulation schemes can be used to generate a PES from the various types of servo burst patterns disclosed above, as was explained above. For example, it is possible to linearly combine a PES demodulation using A, B, C and D bursts, with one using the A', B', C' and D' bursts. It is also possible that a servo burst-demodulation scheme combine bursts within a same burst group (e.g., A and A' bursts), or combine different types of bursts within different burst groups (e.g., an A burst with a B' burst). These are just examples which are not meant to be all inclusive. One of ordinary skill in the art will appreciate that numerous other types of servo burst-demodulation schemes can be used with the burst patterns of the present invention.

Exemplary Media-Writer

Figure 13:
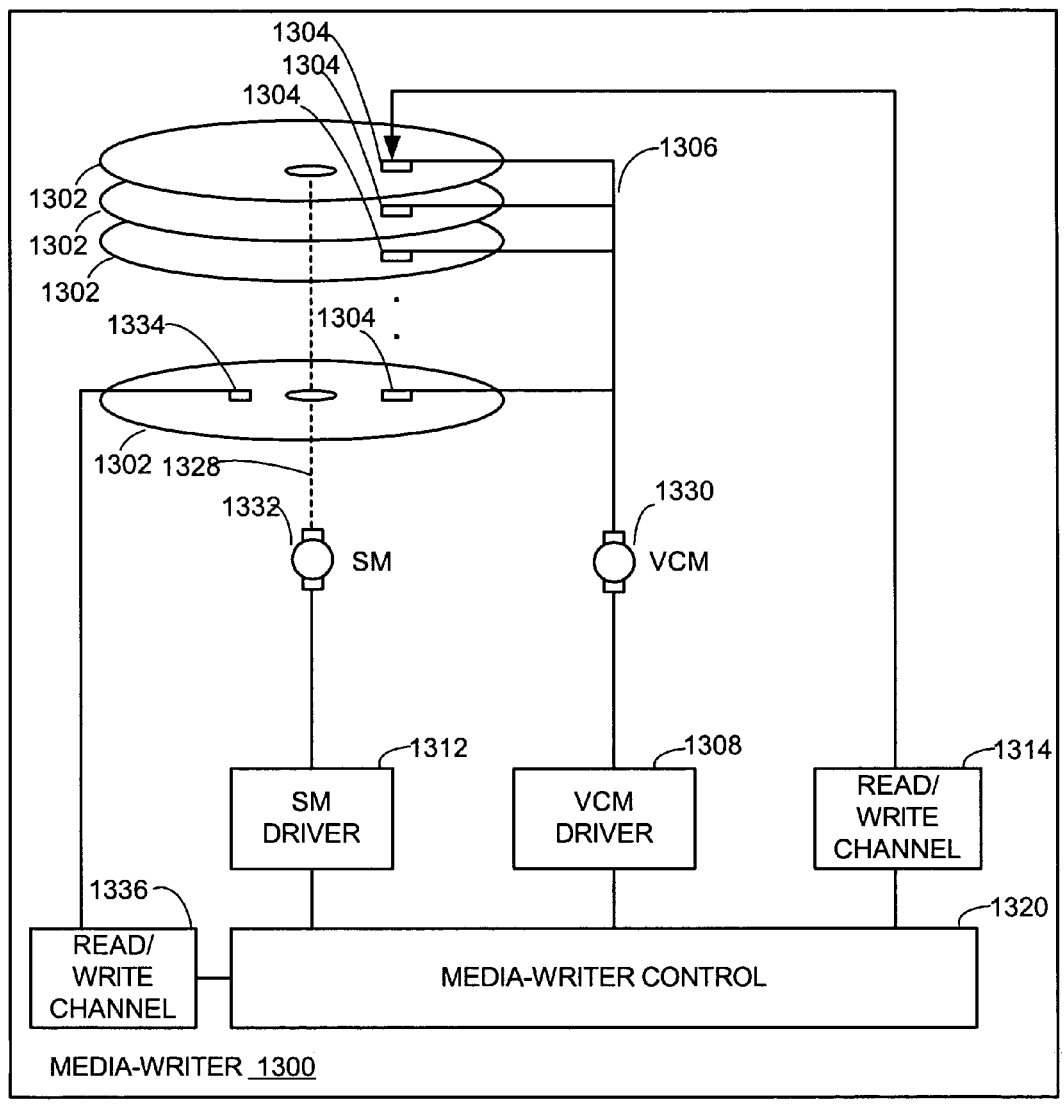
FIG. 13 is a high level block diagram of an exemplary media-writer station.

FIG. 13 is a high level block diagram of an exemplary media-writer station 1300 that can be used to write the burst patterns of the various embodiments of the present invention described above. The media-writer 1300 includes an actuator assembly 1306, a plurality of read/write (R/W) heads 1304, a read/write (R/W) channel 1314, a spindle motor (SM) 1332 and a voice coil motor (VCM) 1330. There can be a single RW head 1304 per disk, or a RW head 1304 per surface of a disk (i.e., two RW heads 1304 per disk). There can be a single R/W channel, or there can be multiple R/W channels. The media-writer may also include one or more current pre-amplifiers (not shown) between the heads 1304 and the one or more R/W channels 1314. A SM driver 1312 drives the SM 1332, and a VCM driver 1308 drives the VCM 1330. Each R/W head 1304 includes a write element and a read element.

A plurality of disks 1302 are stacked at once on a writer spindle shaft 1328, with at least one head 1304 being provided for each disk 1302. An air bearing may be associated with the SM 1332 to obtain accurate and stable disk revolution. Similarly, an air bearing may be associated with the VCM 1330 and/or actuator assembly 1306. Optical sensors, or the like, can be used to accurately detect disk revolution. Alternatively, the spindle controller can detect the spindle rotation via sensing of back-EMF crossings of the open-circuit winding of the motor, as is known to one of ordinary skill in the art. Optical encoder technology, laser interferometer technology, a capacitive sensor, or the like, can be used to accurately detect the angle of the actuator assembly 1306. Tilting components of the spindle 1328 and actuator assembly 1306 may also be controlled. It is also possible that the VCM 1330 and actuator assembly 1306 can be replaced with a common cartridge that is controlled by a linear motor, e.g., as described in U.S. Pat. No. 5,012,363, which is incorporated herein by reference.

A controller 1320 controls the SM driver 1312, the VCM driver 1308, and the R/W channel 1314. The controller 1312 likely includes, or is in communications with, a microprocessor. The controller may include a servo controller, a phase lock loop (PLL), and other (or alternative) components for accurately controlling the rotation of the disks 1302, positioning of the heads 1304, and writing of servo patterns. For example, the controller may also include a stable clock system, a write pattern generator, a pattern detection unit, or the like, and other (or alternative) elements used for writing precise servo patterns on surfaces of the disk 1302. Such a stable clock system may include a separate clock head 1334 that flies over one of the disk surfaces and a clock read/write channel 1336 to provide a coherent clock signal. The controller 1320 can control the write currents provided to the write elements. An identical write current can be provided to each of the heads 1304 (and more specifically to the write element on each head), or each head 1304 can receive its own unique write current.

The media-writer 1300 is likely sensitive to vibration, contamination, and electromagnetic interference. Accordingly, it is likely operated on a heavy granite anti-vibration table in a clean room that is itself protected from vibration and shock.

As mentioned above, the media-writer 1300 can be used to write servo patterns on each disk 1302 in the stack of disks 1302. Each disk 1302 can then removed from the media-writer 1300 and placed in a separate drive containing multiple blank disks, such that the drive can use the patterned disk as a reference to re-write servo patterns on all of the other disk surfaces in the drive, as well as writing a servo pattern on the patterned surface, if desired. The media-writer 1300 is a relatively expensive instrument, and it may take a relatively long time for it to write a reference pattern on the stack of disks 1302. However, as mentioned above, if the stack contains many disks 1302, e.g., ten disks, then the media-writer 1300 can write the reference pattern for ten drives in approximately the same time that it would have taken to servowrite a single drive. It is also possible that the media writer is used to write the final patterns on the disk surface(s). Such disks can then be placed in disk drives and used "as is" (i.e., without re-writing of servo patterns).

Exemplary HDA at a Servowriter Station

Figure 14:
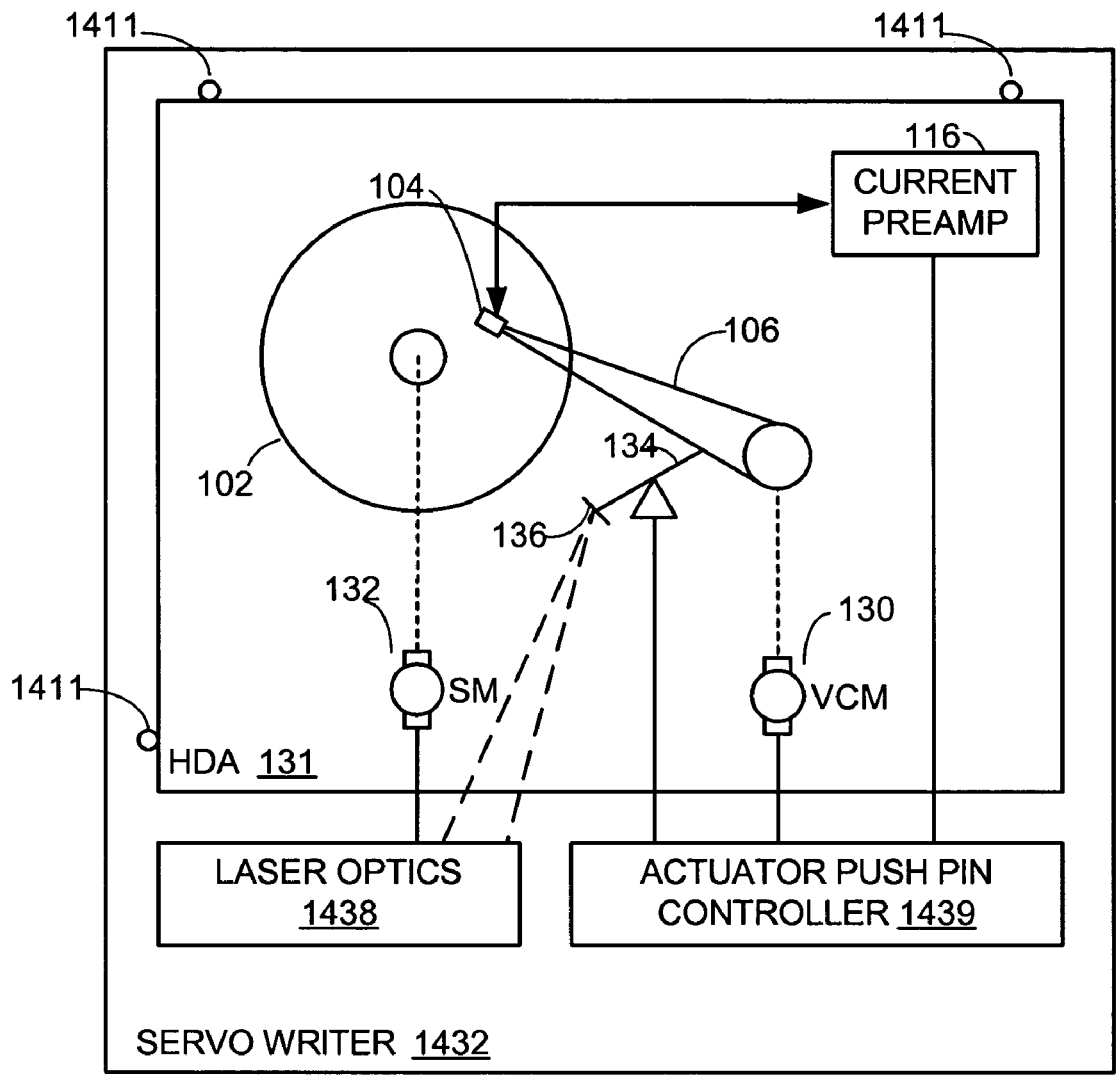
FIG. 14 is a high level block diagram of an exemplary head disk assembly located at a servowriter station.

The burst patterns of the various embodiments of the present invention described above can also be written during servowriting performed at a servowriter station. Referring now to FIG. 14, an exemplary HDA 131 is located at an exemplary servowriter station 1432 (likely within a clean room) and placed in registration with alignment pins 1411. Many components of the exemplary head disk assembly (HDA) 131 were described above with reference to FIG. 1.

The HDA 131 likely also includes an opening formed in a base wall, sidewall or cover plate for admitting a mechanical or virtual (e.g. optical) push-pin 1434 of the servowriter 1432. The push-pin 1434 has an engagement end which engages the actuator arm 106 and another end coupled to a retro-reflector 1436. The retro-reflector 1436 reflects a laser beam back to a laser optics unit 1438 within the servowriter 1432. The laser optics unit 1438 can use conventional laser interferometry techniques to determine precise relative location of the retro-reflector 1436 relative to reference pins 1411 and thereby indirectly determines relative position of the push-pin 1434 and actuator arm 106 relative to the disk 102. This relative position information is fed into an actuator push-pin controller unit 1439 which controls position of the push-pin 1434 and thereby controls position of the actuator head arm 106 during servowriter aided servowriting operations. Other position system techniques are possible, such as use of an optical encoder attached to the push pin.

The servowriter 1432 can control the SM 132, the VCM 130 and the R/W head 104 via current pre-amplifier 116 in order respectively to rotate the disk 102, position the actuator 106 and write and possibly check digital servo information fields and servo burst patterns on the disk(s) 102. The servowriter 1432 may also include a clock head (not shown) that is inserted through an opening in the HDA 131 such that the clock head flies over one of the disk surfaces, to assist in providing a coherent clock signal.

In accordance with an embodiment of the present invention, a servowriter (such as the servowriter 1432) is used to write the final servo burst patterns of the present invention described above. Alternatively, the servowriter can be used to write initial reference servo burst patterns that are later used during self-servo writing to write the final servo burst patterns.

After the servo burst pattern (final or initial) is written at the servowriter station 1432, the HDA 131 is sealed relative to the ambient atmosphere (e.g., by placement of a protective stickers over the push-pin opening and a clock track head opening in the base wall, sidewall or cover plate). The sealed HDA 131 can then be moved (e.g., from the clean room environment) to an assembly station at which a drive circuit board 150 carrying disk drive electronics may be mounted to and electrically connected to the HDA 131, as shown in FIG. 1, discussed above. It is also possible that a disk drive is produced without ever using a servowriting station. This is becoming more prevalent as self-servo writing is becoming the preferred scheme for writing all servo information.

Referring back to FIG. 1, the completed disk drive 100 can then moved to a self-scan unit. The self-scan unit can include a diskware download station 154 for downloading disk control software, including self-servo-write control software, from a central computer, e.g. to reserved tracks for retrieval and execution by the drive's digital controller on the circuit board 150. These reserved tracks may be completely servowritten to enable easier code writing for the completed hard disk drive 100. Alternatively, the disk control firmware can be stored in electrically programmable read only memory (not specifically shown) on the drive's circuit board 150, or it can be downloaded to the drive via a serial port facility included as an additional part of the drive electronics.

Alternatively, a special circuit board may be connected to the R/W head 104 via preamplifier 116, the SM 132, and the VCM 130. This special circuit board would typically include the functions identified in association with the disk drive product circuit board 150, but would be specially adapted for drive self-servo-writing operation, and therefore typically be endowed with greater computing speed and capacity than the drive circuit board 150, enabling use of multiple self-written servo bursts and multi-rate servo pattern sampling techniques, etc., in order to self-write a final burst pattern. After the final product servo patterns are self-written, the special circuit board would be disconnected, and the drive circuit board 150 would be installed and connected, thereby completing disk drive assembly. Diskware download via the function 154 could then occur via the interface or a separate serial port of the circuit board 150, or diskware could be downloaded via the specialized circuit board. Alternatively, the circuit board 150 could be pre-programmed to contain the drive's operating firmware before being mated to a servo-written HDA.

The assembled drive 100 can remain at the self-scan station for several hours. The self-scan process may require many hours to carry out the self-servowriting processes of the present invention. In accordance with embodiments of the present invention, by the time the disk drive 100 leaves the self-scan unit, the final servo burst patterns will have been self-written to the disk(s) 102.

In accordance with an embodiment of the present invention, the final preferred servo patterns are self servo-written while the disk drive 100 is at the self-scan unit/station. More specifically, in accordance with an embodiment of the present invention, the servo burst patterns of the present invention can be written entirely during self servo-writing. Alternatively, initial reference servo burst patterns can be written by a servowriter, which are later used during self-servo writing to write the final servo burst patterns.

Completion of the disk drive will typically also include testing of the heads, media, mechanics, etc. tuning up read-channel characteristics, as well as scanning of the disk surfaces to identify defective areas. Once the disk drive 100 is complete, the disk controller 128 can accept information from a host 122 and can control many disk functions. The host 122 can be any device, apparatus, or system capable of utilizing the disk drive 100, such as a personal computer, Web server or consumer electronics device. The disk controller 128 can include an interface controller in some embodiments for communicating with the host 122, and in other embodiments a separate interface controller can be used.

Although embodiments described herein refer generally to systems having a read/write head that can be used to write bursts on rotating magnetic media, similar advantages can be obtained with other such data storage systems or devices. For example, a laser writing information to an optical media can take advantage of additional passes when writing position information. Any media, or at least any rotating media, upon which information is written, placed, or stored, may be able to take advantage of embodiments of the present invention.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A rotatable storage media including multiple concentric data tracks and servo sectors embedded within the tracks, the servo sectors including servo burst patterns, the servo burst patterns comprising:
   a plurality of burst groups, with each of said burst groups including
      a trimmed burst that is stitched and trimmed such that is has a first width; and
      an untrimmed burst that has a second width that is less than said first width.

2. The rotatable storage media of claim 1, wherein said trimmed burst and said untrimmed burst of a same said burst group are circumferentially adjacent to one another.

3. The rotatable storage media of claim 1, wherein the servo burst patterns are written during a two servowriting steps per data-track servowriting process.

4. The rotatable storage media of claim 3, wherein the servo burst patterns are written such that trimming and writing that occur during a same servowriting step are performed during a same pass.

5. The rotatable storage media of claim 3, wherein the servo burst patterns are written such that trimming and writing that occur during a same servowriting step are performed during separate passes.

6. A method for writing position information to a rotating media, comprising:
  writing servo sectors that include final servo patterns having both trimmed and untrimmed servo bursts within a same servo sector.

7. The method of claim 6, wherein trimming and writing that occur during a same servowriting step are performed during a same pass.

8. The method of claim 6, wherein trimming and writing that occur during a same servowriting step are performed during separate passes.

9. A method for writing position information to a rotating media, comprising:
  writing servo sectors that include servo patterns having both trimmed and untrimmed servo bursts within a same servo sector
  wherein the writing includes writing a plurality of burst groups, with each of said burst groups including:
    a trimmed burst that is stitched and trimmed such that is has a first width; and
    an untrimmed burst that has a second width that is less than said first width.

10. The method of claim 9, wherein trimming and writing that occur during a same servowriting step are performed during a same pass.

11. The method of claim 9, wherein trimming and writing that occur during a same servowriting step are performed during separate passes.

12. A rotatable storage media including multiple concentric data tracks and servo sectors embedded within the tracks, the servo sectors including final servo burst patterns, the final burst pattern within a same servo sector comprising:
  a plurality of servo burst groups, with each of said servo burst groups including
    a first untrimmed burst that has a first width; and
    a second untrimmed burst that has a second width that is less than said first width by at least $\frac{1}{16}^{th}$ of a data track width.

13. The rotatable storage media of claim 12, wherein said first and second untrimmed bursts of a same said burst group are circumferentially adjacent to one another.

14. The rotatable storage media of claim 12, wherein the servo burst patterns are written during a two servowriting steps per data-track servowriting process.

15. The rotatable storage media of claim 14, wherein:
  said first untrimmed burst of each of said burst groups is written using a first write current; and
  said second untrimmed burst of each of said burst groups is written using a second write current that is less than said first write current.

16. The rotatable storage media of claim 15, wherein the servo burst patterns are written during a two servowriting steps per data-track servowriting process.

17. The rotatable storage media of claim 16, wherein the first and second untrimmed bursts of the same burst group are written during a same pass.

18. The rotatable storage media of claim 16, wherein the first and second untrimmed bursts of the same burst group are written during separate passes.

19. A method for writing position information to a rotating media, comprising:
  writing servo sectors that include final servo patterns having first and second untrimmed servo bursts within a same servo sector, said first untrimmed servo burst having a first width and said second untrimmed servo burst having a second width that is less than said first width by at least $\frac{1}{16}^{th}$ of a data track width.

20. The method of claim 19, wherein the writing step includes:
  writing a first untrimmed burst and a second untrimmed burst of a first burst group during a first servowriting step;
  writing a first untrimmed burst and a second untrimmed burst of a second burst group during a second servowriting step;
  writing a first untrimmed burst and a second untrimmed burst of a third burst group during a third servowriting step; and
  writing a first untrimmed burst and a second untrimmed burst of a fourth burst group during a fourth servowriting step.

21. The method of claim 19, wherein:
  the first untrimmed burst of each of the burst groups is written using a first write current; and
  the second untrimmed burst of each of the burst groups is written using a second write current that is less than the first write current.

22. The method of claim 19, wherein the first and second untrimmed bursts of the same burst group are written during a same pass.

23. The method of claim 19, wherein the first and second untrimmed bursts of the same burst group are written during separate passes.

24. A rotatable storage media including multiple concentric data tracks and servo sectors embedded within the tracks, the servo sectors including final servo burst patterns, the final servo burst patterns within a same servo sector comprising:
  a plurality of burst groups, with each of said burst groups including
    a first trimmed burst that is stitched and trimmed such that is has a first width; and
    a second trimmed burst that that is stitched and trimmed such that it has a second width that is less than said first width by at least $\frac{1}{16}^{th}$ of a data track width.

25. The rotatable storage media of claim 24, wherein said first trimmed burst and said second trimmed burst of a same said burst group are circumferentially adjacent to one another.

26. The rotatable storage media of claim 24, wherein the servo burst patterns are written during a two servowriting steps per data-track servowriting process.

27. The rotatable storage media of claim 26, wherein the servo burst patterns are written such that trimming of the first and second bursts of a same burst group, that occur during a same servowriting step, occur during a same pass of the same step.

28. The rotatable storage media of claim 26, wherein the servo burst patterns are written such that trimming of the first and second bursts of a same burst group, that occur during a same servowriting step, occur during separate passes of the same step.

29. A rotatable storage media including multiple concentric data tracks and servo sectors embedded within the tracks, the servo sectors including servo burst patterns, the servo burst patterns comprising:
- a plurality of burst groups, with each of said burst groups including
  - a first trimmed burst that is stitched and trimmed such that is has a first width; and
  - a second trimmed burst that that is stitched and trimmed such that it has a second width that is less than said first width,
- wherein said first burst of each of said burst groups is trimmed using a first current; and
- wherein said second burst of each of said burst groups is trimmed using a second current that is greater than said first write current.

30. A rotatable storage media including multiple concentric data tracks and servo sectors embedded within the tracks, the servo sectors including servo burst patterns, the servo burst patterns comprising:
- a plurality of burst groups, with each of said burst groups including
  - a first trimmed burst that is stitched and trimmed such that is has a first width; and
  - a second trimmed burst that that is stitched and trimmed such that it has a second width that is less than said first width,
- wherein said first burst of each of said burst groups is written using a first current; and
- wherein said second burst of each of said burst groups is written using a second current that is less than said first write current.

31. A method for writing position information to a rotating media, comprising:
- writing servo sectors that include final servo patterns having a plurality of burst groups, with each of said burst groups including
  - a first trimmed burst that is stitched and trimmed such that is has a first width; and
  - a second trimmed burst that that is stitched and trimmed such that it has a second width that is less than said first width by at least $\frac{1}{16}^{th}$ of a data track width.

32. The method of claim 31, wherein said first trimmed burst and said second trimmed burst of a same said burst group are circumferentially adjacent to one another.

33. The method of claim 31, comprising writing the servo burst patterns during a two servowriting steps per data-track servowriting process.

34. The method of claim 33, comprising writing the servo burst patterns such that trimming of the first and second bursts of a same burst group, that occur during a same servowriting step, occur during a same pass of the same step.

35. The method of claim 33, comprising writing the servo burst patterns such that trimming of the first and second bursts of a same burst group, that occur during a same servowriting step, occur during separate passes of the same step.

36. The method of claim 33, comprising writing the servo burst patterns such that writing of the first and second bursts of a same burst group, that occur during a same servowriting step, occur during a same pass of the same step.

37. The method of claim 33, comprising writing the servo burst patterns such that writing of the first and second bursts of a same burst group, that occur during a same servowriting step, occur during separate passes of the same step.

38. A method for writing position information to a rotating media, comprising:
- writing servo sectors that include servo patterns having a plurality of burst groups, with each of said burst groups including
  - a first trimmed burst that is stitched and trimmed such that is has a first width; and
  - a second trimmed burst that that is stitched and trimmed such that it has a second width that is less than said first width
- wherein said first burst of each of said burst groups is trimmed using a first current; and
- wherein said second burst of each of said burst groups is trimmed using a second current that is greater than said first current.

39. A method for writing position information to a rotating media, comprising:
- writing servo sectors that include servo patterns having a plurality of burst groups, with each of said burst groups including
  - a first trimmed burst that is stitched and trimmed such that is has a first width; and
  - a second trimmed burst that that is stitched and trimmed such that it has a second width that is less than said first width
- wherein said first burst of each of said burst groups is written using a first current; and
- wherein said second burst of each of said burst groups is written using a second current that is less than said first current.

* * * * *